Figure 3:
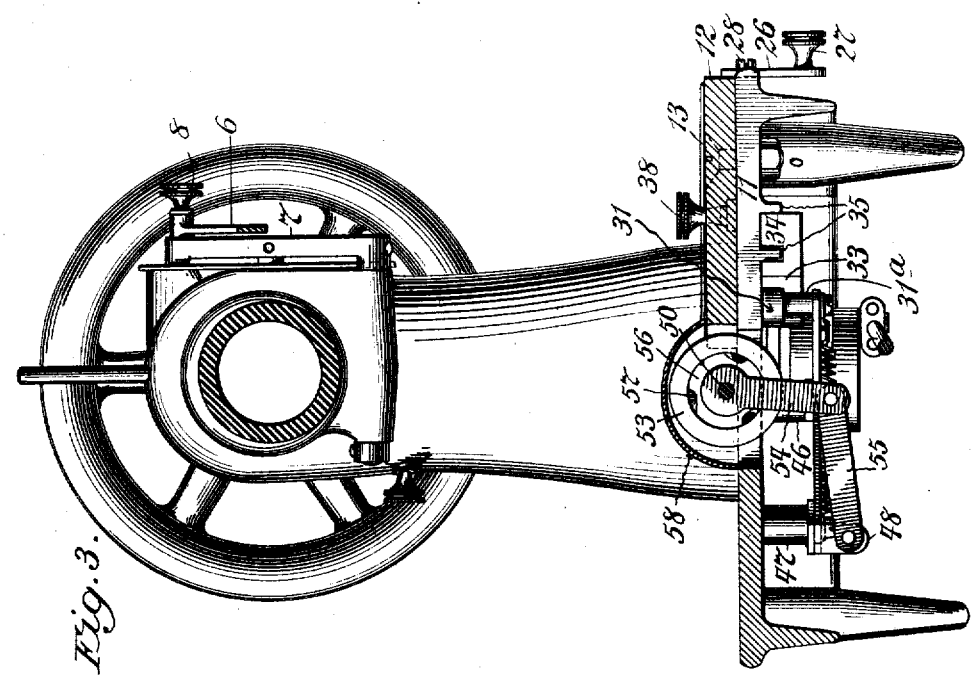

No. 894,541. PATENTED JULY 28, 1908.
C. SCUDDER & F. CORYELL.
BLIND STITCHING SEWING MACHINE.
APPLICATION FILED DEC. 5, 1903.
8 SHEETS—SHEET 1.
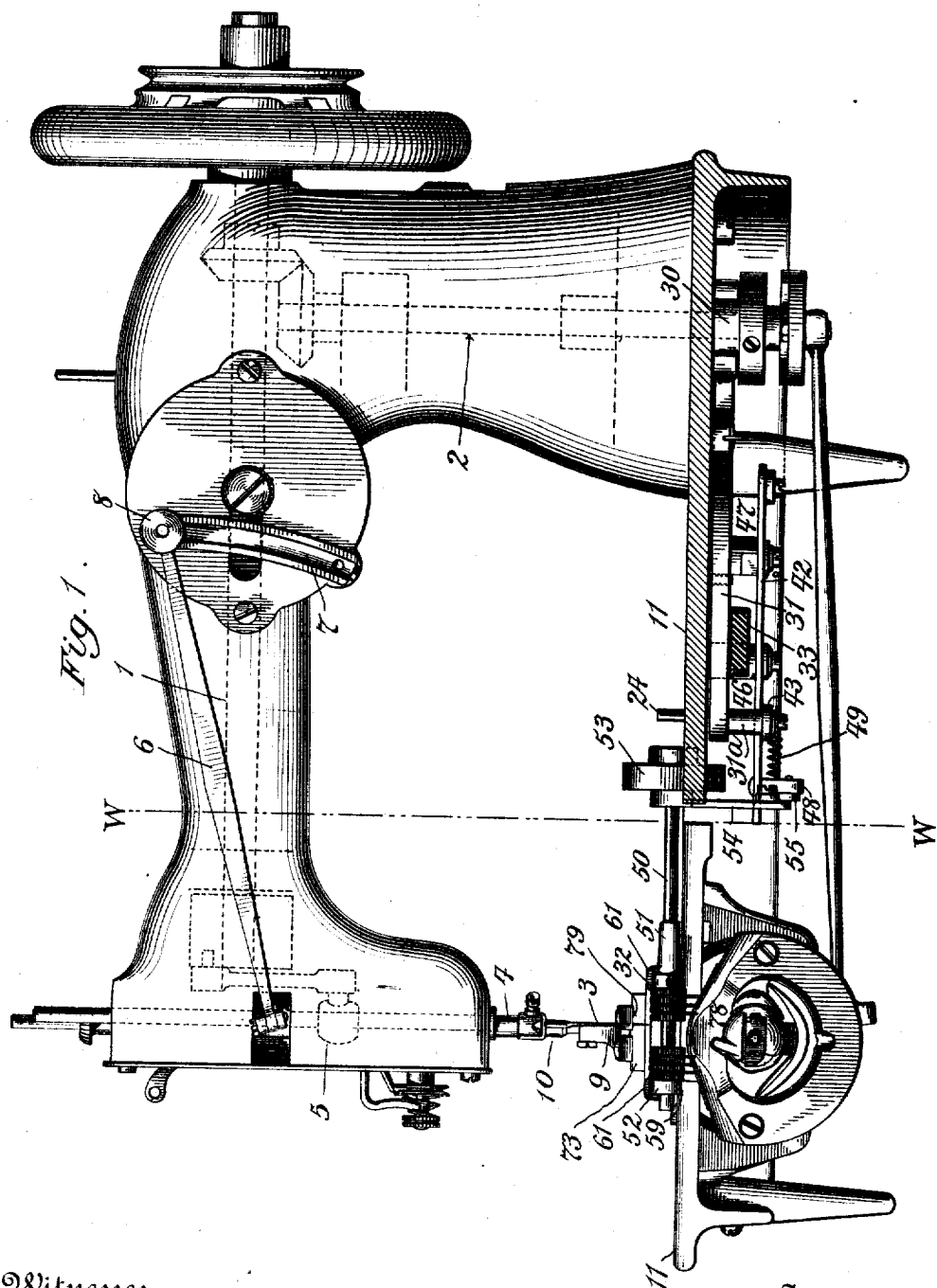

No. 894,541. PATENTED JULY 28, 1908.
C. SCUDDER & F. CORYELL.
BLIND STITCHING SEWING MACHINE.
APPLICATION FILED DEC. 5, 1903.

8 SHEETS—SHEET 2.

Witnesses
Edward Rowland,
Anna R. McCole

Inventors
Charles Scudder
Frank Coryell.
By their Attorney
Edward P. Thompson

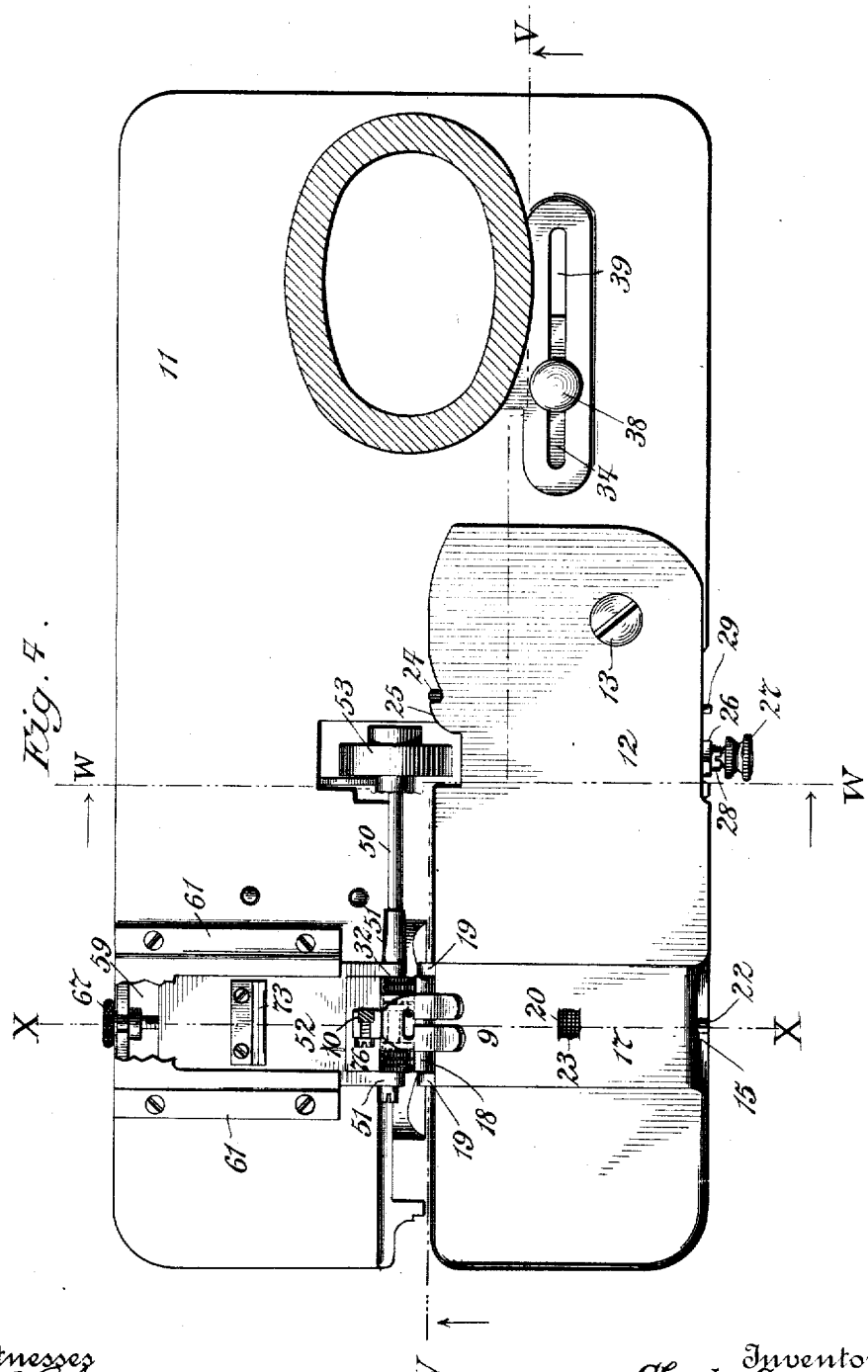

No. 894,541. PATENTED JULY 28, 1908.
C. SCUDDER & F. CORYELL.
BLIND STITCHING SEWING MACHINE.
APPLICATION FILED DEC. 5, 1903.
8 SHEETS—SHEET 4.
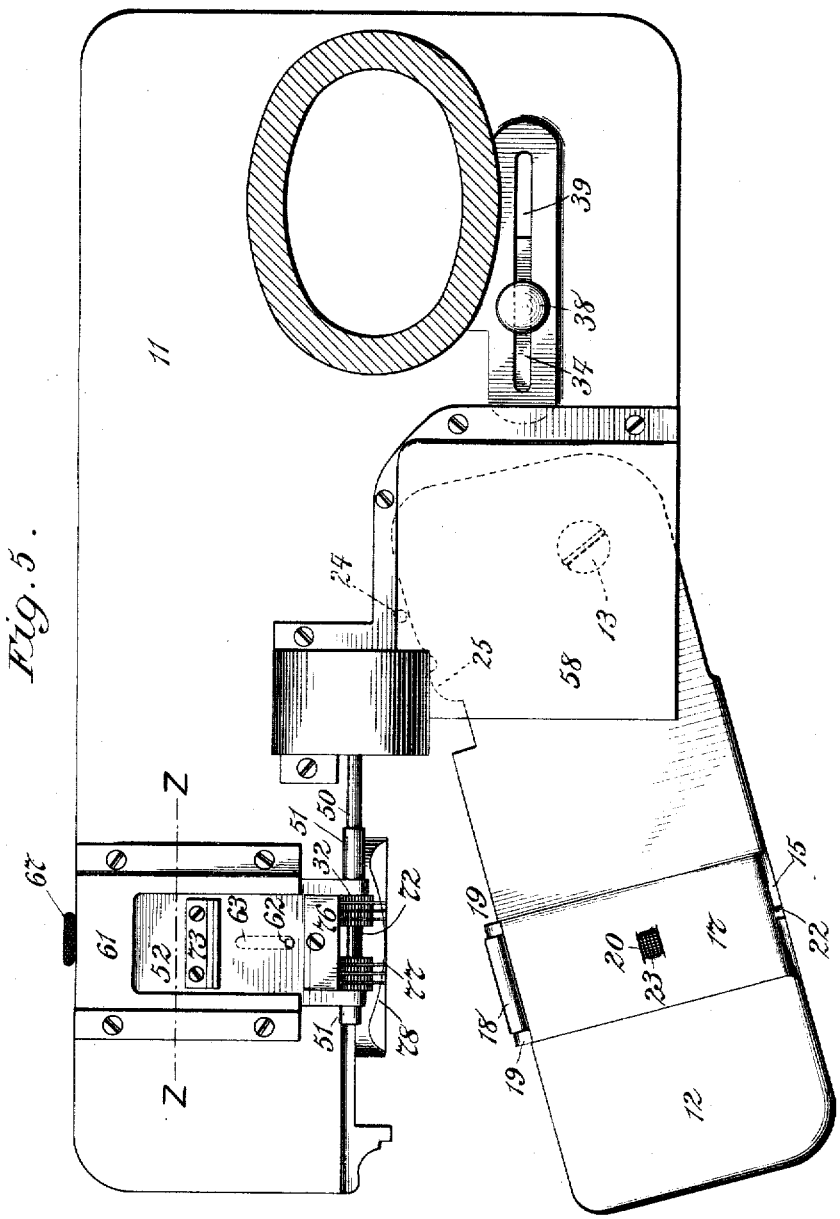

No. 894,541. PATENTED JULY 28, 1908.
C. SCUDDER & F. CORYELL.
BLIND STITCHING SEWING MACHINE.
APPLICATION FILED DEC. 5, 1903.

8 SHEETS—SHEET 5.

Witnesses
Edward Bayland
Anna G. McCole

Inventors
Charles Scudder
Frank Coryell.
By their Attorney
Edward P. Thompson

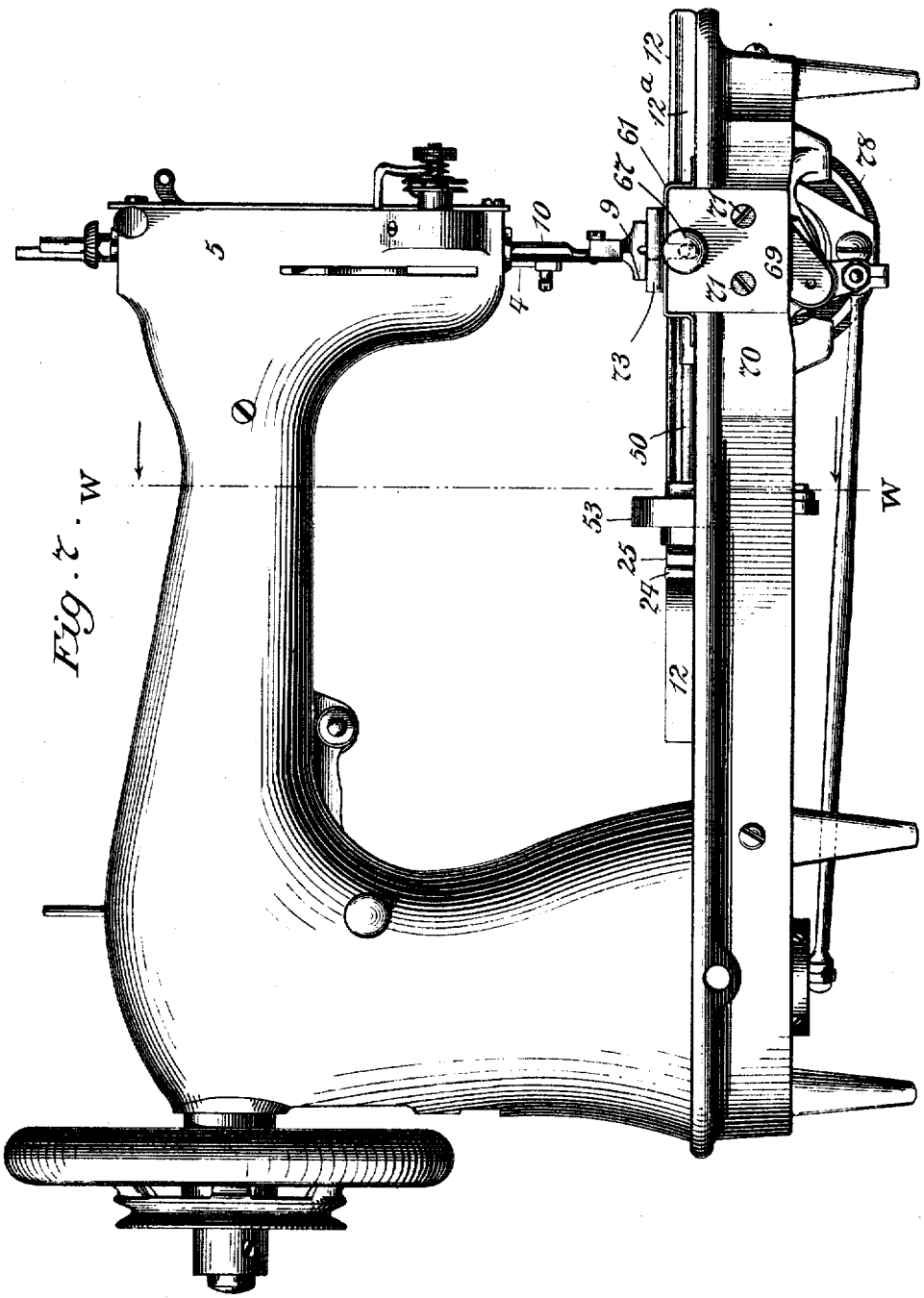

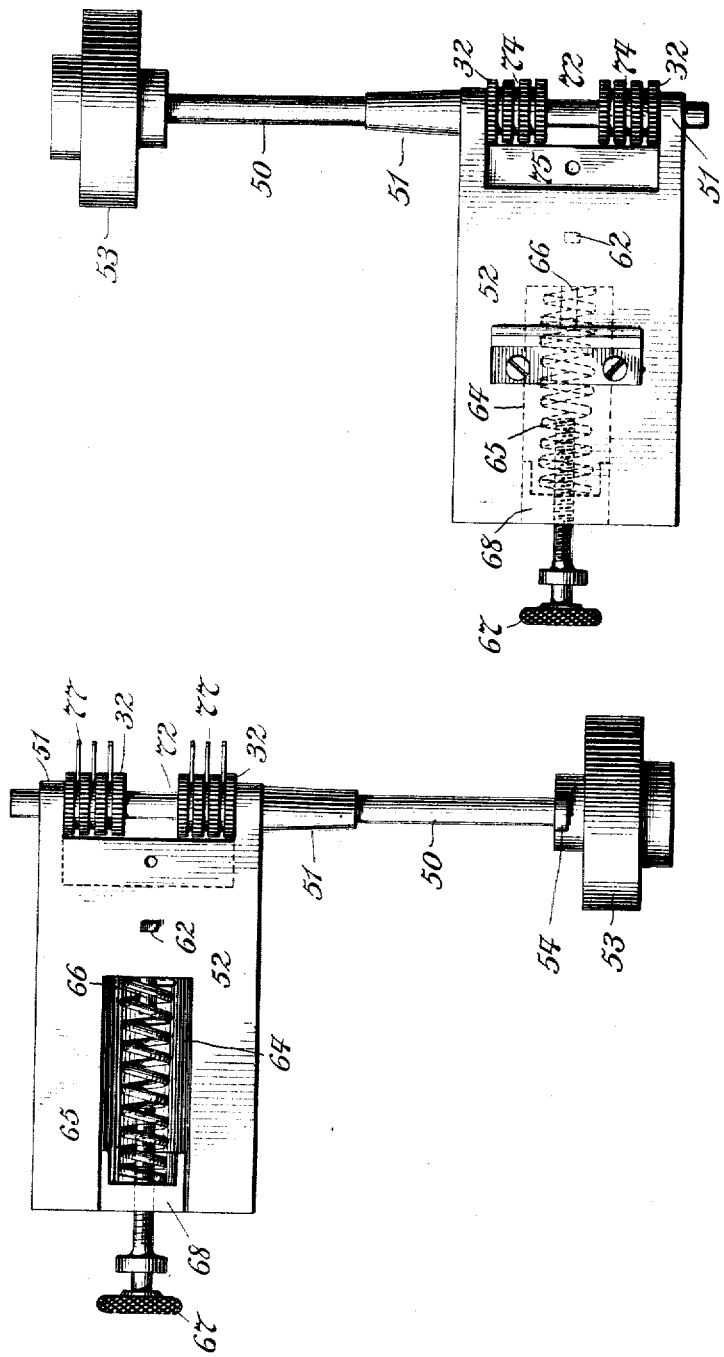

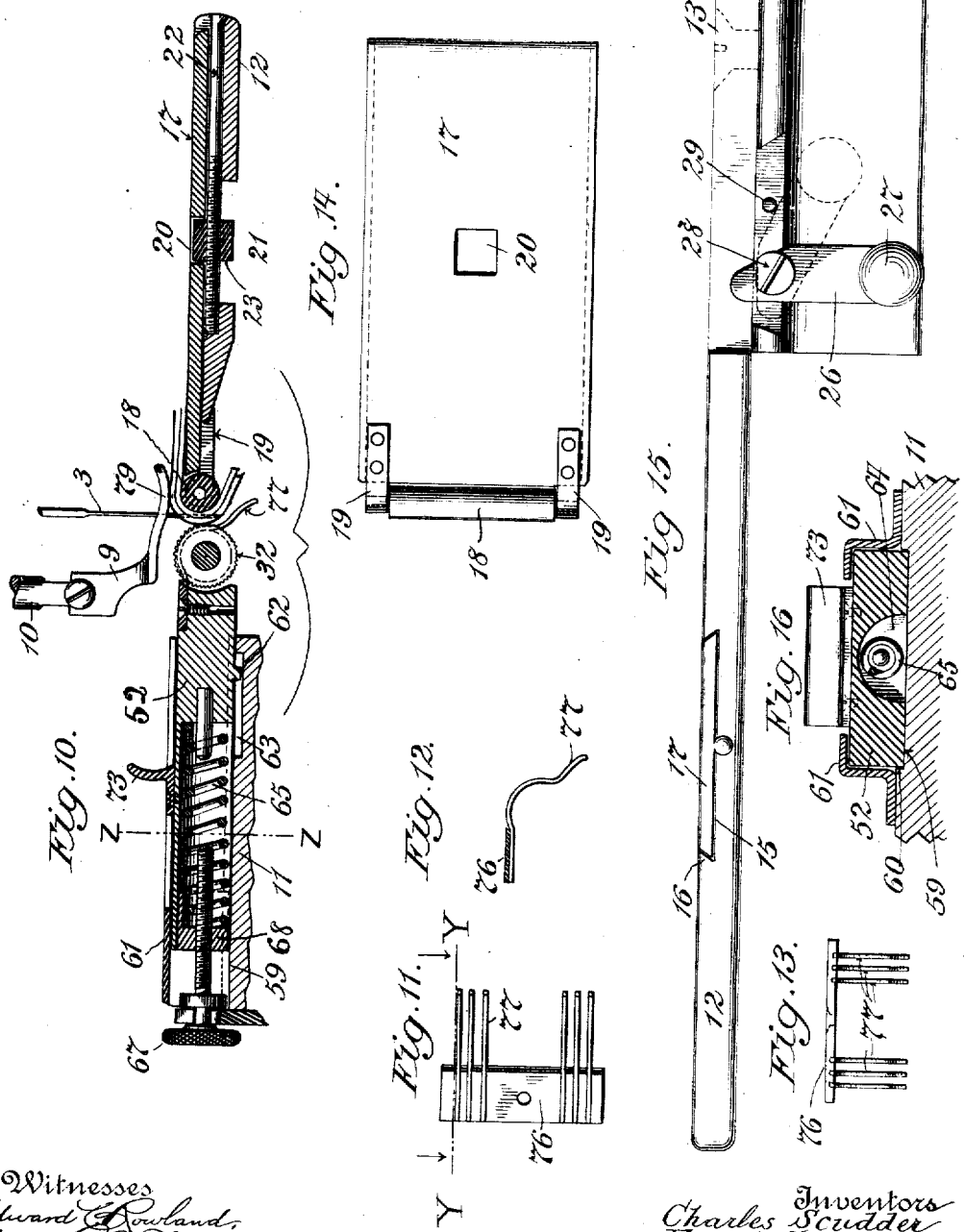

UNITED STATES PATENT OFFICE.

CHARLES SCUDDER AND FRANK CORYELL, OF TRENTON, NEW JERSEY.

BLIND-STITCHING SEWING-MACHINE.

No. 894,541.      Specification of Letters Patent.      Patented July 28, 1908.

Application filed December 5, 1903. Serial No. 183,955.

*To all whom it may concern:*

Be it known that we, CHARLES SCUDDER and FRANK CORYELL, citizens of the United States of America, and residents of Trenton, in the county of Mercer and State of New Jersey, have invented certain new and useful Improvements in Blind-Stitching Sewing-Machines, of which the following is a specification.

A difficulty heretofore experienced with blind stitching sewing machines has been that they could not finish certain classes of work, such as the bottoms and lapels of coats etc., but only circular work, such as trousers legs, skirt bottoms etc. The reason for this defect lies in the fact that with these machines the feed is at a point more or less distant from the needle, thus, unless the work is of a circular character, always leaving unsewed that portion of the material between the points where it is grasped by the feed and engaged by the needle. The result has been to greatly limit the field of usefulness of blind stitching machines; such work as they were unfitted to properly do being still done by hand. Another disadvantage found with former blind stitching machines has been that, in sewing goods of a close or tough texture, they are not sufficiently held by the presser foot, and as the point of the needle touches the fabric the fabric stretches or moves sufficiently to divert the course of the needle, throwing it against the shuttle, or the needle may pass entirely through all the goods and not make a blind stitch. To overcome this moving of the goods, the ordinary practice has been for the operator to hold the unsewed end with a manual tension. This tension to be effectual must be uniform, for if it is too great, the thickness of the goods against the cloth roller at the stitching point will be reduced and the needle will not take hold of the goods at all or not sufficiently to make a blind stitch, the under cloth being stretched and compressed to such a thinness that the needle will not touch it. If the tension is too little, then the goods will move, with the results as above stated. It is a physical impossibility for the operator to pull with the same tension upon the cloth at all times, and even if this could be accomplished by the presser foot uniformly upon all kinds of fabrics, the distance between the presser foot and the stitching point would permit of a stretching of the goods which would decrease the probability of a perfect stitch. The difficulties just enumerated in this class of machines result from the cloth not being properly held at the stitching point while the stitch is being made.

The main object of our invention is to overcome the above named serious defects in blind stitching sewing machines. We have also, in carrying out the main ideas, added many minor improvements with the object of producing a machine at once easily accessible, quickly adjustable and convenient of operation.

In general terms, the organization comprising the invention consists of a work carrier having a working surface for the cloth to be sewed, a feeding mechanism for said cloth consisting of two coacting elements, and a reciprocating needle whose path lies between said elements, the said mechanism being adapted to feed the cloth from its path on said surface to a position below said surface.

More specifically, the improved machine consists of a feed roller whose axis is horizontal and which is adapted to feed the material to be worked upon in a vertical direction, a cloth roller parallel to and contiguous to the feed roller and lying approximately in the same horizontal plane and around which the said material may fold and pass between said rollers, a vertically reciprocating vertical needle whose path lies between said rollers, said feed roller having an annular portion cut away in the path of said needle, a shaft upon which said feed roller is secured, a slide having bearings for and carrying said shaft, said feed roller and slide being yieldable in a horizontal direction away from said cloth roller, said slide having a check for limiting its movement in each direction, a spring pressing said slide and feed roller towards said cloth roller, means for adjusting the tension of said spring, a clutch on said shaft, a lever extending downward from said clutch, a driving mechanism, a substantially horizontal link connecting said lever with said mechanism, said mechanism consisting of a compound lever, a bed plate for the machine, said bed plate having guiding surfaces for receiving and guiding said slide, a retaining clip for said slide attached to said bed plate, a thumb piece secured to the top of said slide, said means consisting of a thumb screw, a bearing for said thumb screw attached to said bed plate, and a traveling nut on said thumb screw and engaging said spring, a cloth plate to one edge of which said cloth roller is attached, a horizontally swinging work carrier fulcrumed on said bed plate, said cloth plate being mounted on said work carrier and adjustable thereon to and from said needle, a vertical pivot for said work carrier, a stop for limiting the inward movement of said carrier, a latch for locking said carrier in operative position, said work carrier having a transverse undercut depression on its upper surface, said cloth plate being seated and guided in said depression and the upper surface of said plate being flush with the upper surface of said work carrier, said carrier having a transverse slot therethrough and said cloth plate having an opening therethrough registering with said slot, a screw fixed transversely in said carrier and traversing said slot, a thumb nut movable on said screw in said slot and engaging said cloth plate at said opening, said feed roller having annular grooves therein, cloth-guiding fingers lying in said grooves and extending downwardly and outwardly, said fingers being carried by said slide, said slide having a depressed seat in its upper surface and adjoining said feed roller, a plate secured in said seat, the upper ends of said fingers being attached to said plate, and a presser foot above said cloth roller and adapted to press said material down thereupon.

The invention will now be described in detail with reference to the accompanying drawings.

Figure 2:
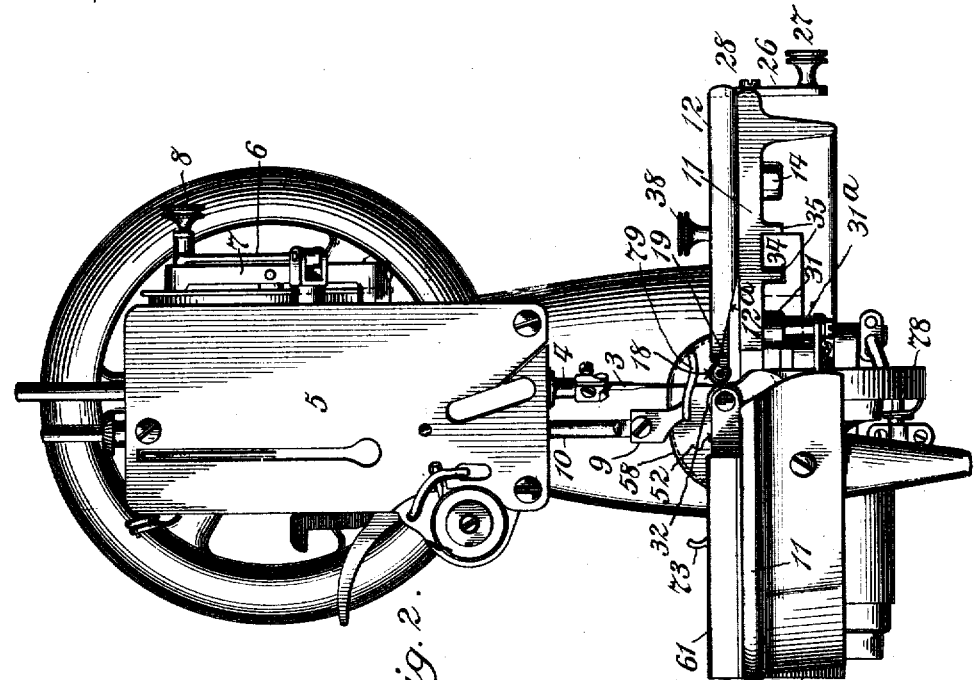
Figure 6:
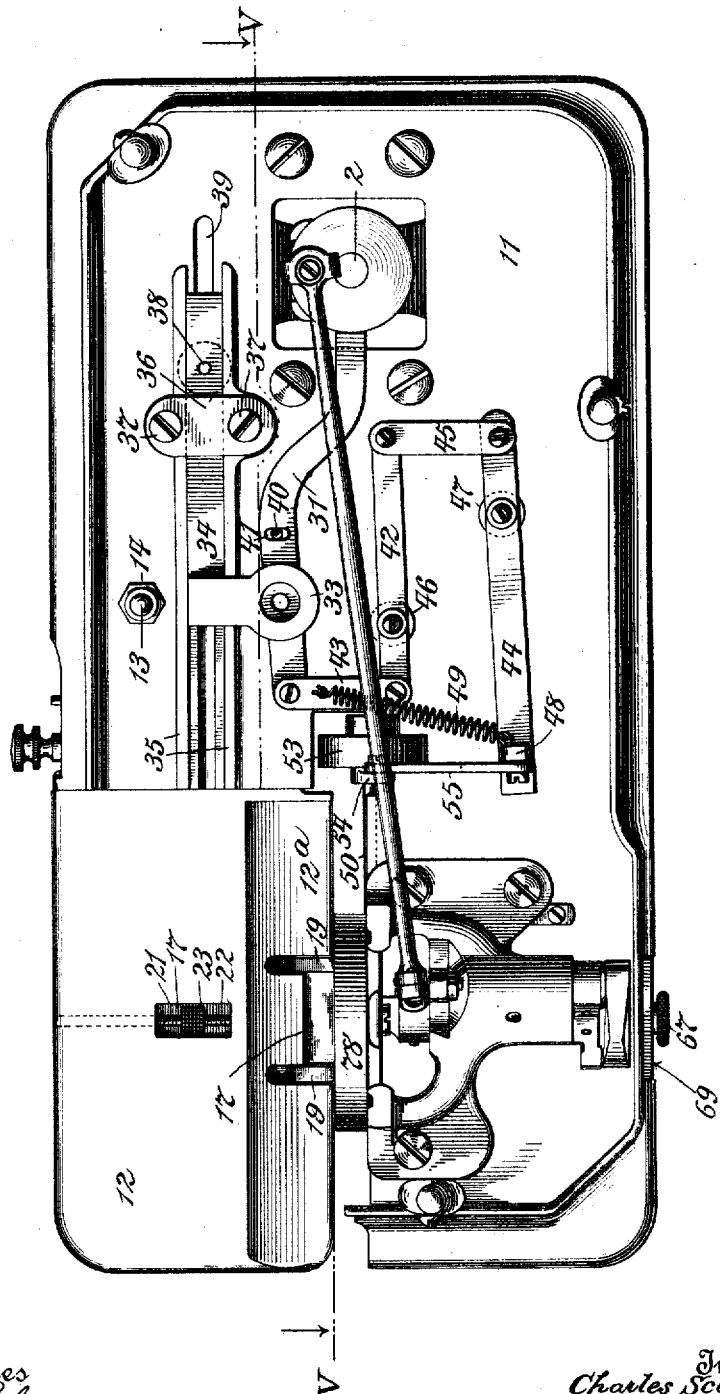

Figure 1 is an elevation of that portion of the machine above the bed plate, and a vertical section of the bed plate on the lines V—V of Figs. 4 and 6, the work carrier being removed to give a clear view of the feed roller, and the mechanism beneath the bed plate being shown in elevation. Fig. 2 is an elevation of the machine from the left of Fig. 1, the work carrier being in place, and shows the relation of the feed roller and cloth roller to each other and to the needle. Fig. 3, is a section on the lines W—W of Figs. 1, 4 and 7, Figs. 1 and 4 being viewed from the left, and Fig. 7 from the right. This figure shows the clutch for operating the feed roller and the mechanism by which the same is driven. Fig. 4 is a plan of the machine with the head cut off, the housing removed, and the presser foot shown with its bar in section. A portion is broken away to show the feed pressure adjusting screw. Fig. 5 is a plan the same as Fig. 4, but shows the work carrier swung open and the presser foot removed, also the housing being in place. Fig. 6 is an inverted plan of the whole machine showing the entire mechanism beneath the bed plate with all parts in place, this view being in an opposite direction to Figs. 4 and 5. Fig. 7 is a rear elevation of the machine, showing that side which is opposite to that shown in Fig. 1, all parts being in place, except the housing, which is removed. Fig. 8 is an inverted plan of the feed roller and slide and their adjuncts. Fig. 9 is a top plan of the same as shown in Fig. 8, except the cloth-guiding fingers are removed. Fig. 10 is a partial section on the line X—X of Fig. 4, the cloth being in place, and shows the relative position and detail construction of the various parts. Fig. 11 is an inverted plan of the cloth guiding fingers and the plate to which they are attached. Fig. 12 is a section on the line Y—Y of Fig. 11 viewed in a downward direction. Fig. 13 is a plan showing the cloth-guiding fingers and their plate as viewed from the left of Figs. 11 and 12. Fig. 14 is an inverted plan of the cloth plate with the cloth roller attached. Fig. 15 is a front elevation of the work carrier and a portion of the bed plate, and also shows the latch by which the work carrier is locked in operative position. Fig. 16 is a partial section on the lines Z—Z of Figs. 5 and 10.

The main driving shaft of the machine is the horizontal shaft 1, and 2 is the vertical auxiliary shaft. The needle 3 is carried by the usual needle bar 4 which is supported in the head 5 and connected up in the usual way with the horizontal shaft 1 for reciprocating the needle in a vertical direction. So far as our invention is concerned, the needle may or may not have a lateral throw for producing a zig zag stitch, but it is usual, on account of the requirements of the work, for the needles of blind stitching machines to have such lateral throw, and the machine to which our invention is shown as applied is of that type. The lateral throw is given to the needle bar 4 by the pitman 6 and rocking lever 7, one end of said lever being connected up to said needle bar within the head 5, and the said rock lever being operatively connected to the shaft 1, the amplitude of the throw being varied by adjusting the other end of the said pitman to various positions on the said rock lever by means of the thumb screw 8. The presser foot 9 is carried upon the presser foot bar 10 which is supported in the head 5 in the usual way.

There is nothing new about the mechanism of the presser foot and needle, but they are correlated in a direct way to certain parts of our invention, therefore they are described. Other parts of the general organization of the machine, not so correlated, are not described.

11 is the main bed plate of the machine to the top side of which is pivoted the horizontally swinging work carrier 12 by the vertical counter-sunk screw bolt 13 which serves as a pivot and which has the jam nut 14. The bed plate 11 does not extend under the work carrier 12 except at the pivoted end of said work carrier. The work carrier 12 has a straight working edge extending for some distance both ways from the needle 3 and adjacent to said working edge has a sloping portion 12ª, to allow room for the folding of the cloth thereover. The said work carrier 12 is provided with a transverse depression 15 having under cut edges 16 and in which slides the cloth plate 17, and on the front edge of said cloth plate is a cylindrical cloth roller 18 carried by bearings 19 attached to the under side of said plate. The cloth plate 17 has an opening 20 therethrough registering with the transverse slot 21 through the work carrier 12, and a screw 22 is fixed transversely in said work carrier and traversing said slot, and a thumb nut 23 adapted to travel in said slot on said screw engages the cloth plate 17 at the said opening, for adjusting said cloth plate transversely of said work carrier, and toward or from said needle. A pin 24 set in the bed plate 11 engages the projection 25 on the work carrier 12 and limits the inward movement of said carrier, while the latch 26, having a handle 27 and secured to the bed plate 11 by the screw 28, locks said carrier in operative position. A pin 29 in the edge of the bed plate 11 prevents the latch 26 from swinging too far upward when the same is released.

The cam 30 on the vertical shaft 2 engages one end of the lever 31, and thereby manipulates the mechanism for operating the feed roller 32. The fulcrum of the lever 31 is at 33, and the fulcrum 33 is carried by the bar 34 which slides in guides 35 forming a part of the bed plate 11 and is retained in place by the fastening 36 secured to said bed plate by screws 37, and a screw handle 38 passes upward from bar 34 through a slot 39 in the bed plate 11. The fulcrum 33 may slide on the lever 31, and by adjusting the screw handle 38 to different positions along the slot 39, the fulcrum 33 is moved to correspondingly different positions on the lever 31, for varying the length of the feed. The lever 31 is prevented from moving in a longitudinal direction by a pin 40 carried by the bed plate 11 and engaged in a slot 41 in said lever. The other end of the lever 31 is connected to one end of the lever 42 by the link 43 and interposed distance-block 31ª, and the other end of the lever 42 is connected to one end of the lever 44 by the link 45, and the levers 42 and 44 respectively are supported and swiveled on studs 46 and 47 attached to the under side of the bed plate 11. The other end of the lever 44 carries a swivel stud 48, and a retractile spring 49 connects said stud with the link 43, for taking up all lost motion in the system of levers during their idle stroke, thus enabling them to deliver a complete working stroke. The levers 31, 42 and 44 are each of the first class, and the fulcrums of the levers 42 and 44 are in each case located nearest to the end of the lever at which the power is applied, thus multiplying the motion, so that the end of the lever 44 to which the swivel stud 48 is attached moves several times farther than the end of the lever 31 to which is connected the link 43, the purpose of this multiplied motion being to give a sufficient partial revolution to the feed roller 32 at each vibration of the said levers. The feed roller 32 is fixed on a shaft 50 mounted in bearings 51 on the slide 52. A clutch 53 is secured on the shaft 50, and an operating lever 54 extends downward from said clutch and is connected at its lower end by the substantially horizontal link 55 to the swivel stud 48. The lever 54 is secured to the clutch member 56, which is loose on the shaft 50, the rolls 57 forming an operative connection between the two parts of the clutch. There is nothing new about the mechanism of the clutch 53, therefore the details of its construction need not be further explained. When the lever 54 is oscillated, through its connection with the lever 44 by the link 55 and swivel stud 48, the clutch 53 is operated to intermittently rotate the shaft 50 and feed roller 32. A housing 58 is attached to the bed plate 11 and covers the clutch 53 and the pivoted end of the work carrier 12.

The bed plate 11 has a depressed portion 59 with guiding surfaces 60 within which is located the slide 52. The slide 52 is held in place by the retaining clip 61, which is attached to the bed plate 11 of the machine. The slide 52 is free to move back and forth in a direction toward or from the needle 3, but its movement is limited in each direction by the lug 62 thereon coming in contact with the bed plate 11 at each end of the slot 63 in said bed plate. The slide 52 has a recess 64 on its under side, and within said recess is an expansive helical spring 65, said spring being retained in place by the pin 66 and the inner end of the thumb screw 67, said spring abutting at one end against the slide 52 and at its other end against the traveling nut 68 on the screw 67, the said thumb screw 67 having a bearing 69 attached to the side wall 70 of the bed plate 11 by screws 71, whereby when said thumb screw 67 is turned in one direction the spring 65 is compressed and when it is turned in the opposite direction the tension of the spring 65 is released, the constant tendency of the spring 65 being to force the feed roller 32 towards the cloth roller 18, the said feed roller and cloth roller lying in about the same horizontal plane. The needle 3 reciprocates in a vertical direction near the cloth roller 18 on the side next to the feed roller 32, and the cloth roller 32 has a portion cut away at 72 to allow room for the vertically reciprocating needle 3 to pass without striking, and said feed roller being thus cut away for a width a little greater than the widest lateral throw to which said needle is subject. On the top side of the slide 52 is secured a thumb piece 73 by which the feed roller 32 may be manually pushed back away from the cloth roller 18 against the tension of the spring 65, the said feed roller 32 and shaft 50 being carried straight back and always remaining parallel to the cloth roller 18. The feed roller 32 may yield against the tension of the spring 65 to permit the passage of seams, but such yielding in no way interferes with the proper propulsion of the said feed roller, on account of the vertically disposed lever 54 and horizontal connecting link 55 permitting a free lateral movement of the shaft 50 without interfering with the action of the clutch 53.

The feed roller 32 is provided with annular grooves 74, and the slide 52 has on its upper side a depressed portion 75 in which is seated and secured the plate 76 having attached thereto the cloth-guiding fingers 77, the said fingers 77 lying in said grooves 74 to a depth below the corrugated surface of the feed roller 32 and on the upper and outer sides of said feed roller and extending beyond said feed roller downwardly and outwardly at an angle of about 45 degrees, said fingers 77 being for the purpose of guiding the material to be worked upon around the cloth roller 18 and for directing it away from the shuttle mechanism 78. The fingers 77 are attached to the plate 76 by being secured in grooves on the bottom side thereof.

The shuttle mechanism 78 is readily accessible by swinging open the work carrier 12.

The presser foot 9 is curved downwardly at 79 so that it is adapted to hold the material down upon the cloth roller 18 and at the same time be clear of the feed roller 32, the said material passing beneath the presser foot 9, folding around the cloth roller 18 and being fed downwardly between the cloth roller 18 and the feed roller 32 and in the path of the needle 3, the feed roller 32, by reason of the spring 65, pressing the said material against the cloth roller 18, and the needle 3 piercing the said material at the same horizontal plane at which it is engaged by the feed roller 32.

To insert the work in our machine, the needle 3 should be at its highest point and the presser foot 9 should be raised, then the feed roller 32 should be pushed back by means of the thumb piece 73 and the work slipped over the work carrier 12 and cloth roller 18, or, if more room is desired, by releasing the latch 26 the work carrier 12 may be swung open, the work placed in position around the cloth roller 18, and the work carrier 12 closed, when it will be automatically locked in operative position by the dropping of the latch 26. The depth of the stitch is determined by the distance of the cloth roller 18 from the needle 3, and is regulated by turning the thumb nut 23, which travels on the screw 22 and moves the cloth plate 17. As the work carrier 12 is locked in rigid position, and as the cloth plate 17 slides in the depression 15, the cloth roller 18, in any adjustment, always remains parallel to the feed roller 32. The pressure of the feed roller 32 upon the material being worked upon may be regulated by turning the thumb screw 67. The stitch is formed in a manner common to this class of machines, the material doubling over the cloth roller 18 and the needle 3 piercing the same at the fold. If there is only one thickness of cloth, as in ornamental stitching, and in overseaming, the cloth roller 18 is adjusted so that the needle 3 will pass just near enough to it to pass part way through the cloth and out again on the same side thereof, and when there are two thicknesses of cloth, adjustment is made so that the needle 3 passes through the outer layer of cloth and part way through the second layer and out again through the first named layer, thus stitching the two thicknesses together, in both instances the threads only showing on one side of the work, because the stitch only goes part way through the last thickness of cloth. The cloth roller 18 serves the double purpose of forming a folding edge for the material worked upon and as a backing for the feed roller 32. By reason of the feed roller 32 being located adjacent to the needle 3, the material is grasped by the said feed roller at the same point at which it is engaged by the said needle, thus permitting the seam to begin at the extreme end of a piece of goods, and fitting the machine for straight line work as well as circular seams. Also in our machine the goods in sewing will be held not only by the presser foot, but also by the feed and cloth rollers substantially at each side of the point where the needle enters the goods, so that at all times during sewing the cloth is held firmly at the stitching point. This enables the machine to blind stitch goods of a close or tough texture, which could not otherwise be done. The operator need only guide the goods in sewing.

The upper surface of the cloth support or work-carrier 12, and of the cloth plate 17 forming a part thereof, act as a guide for keeping the cloth in a position transverse to the axis of the needle 3 as the cloth is drawn toward the needle by the feed roller 32, the presser foot 9 at 79 also assisting the work-carrier in this guiding of the cloth transversely, by pressing the cloth down upon the cloth roller 18, all as may be most clearly seen at Fig. 10; the above named elements thus constituting means for guiding said cloth transversely to the axis of and towards said needle.

To change the rapidity of the feed, the length of the partial rotations of the feed roller 32 is changed by adjusting the screw handle 38 along the slot 39. The handle 38 moves the bar 34 and slides the fulcrum 33 along the lever 31, thus varying the length of the active portions of the lever 31 and correspondingly varying the amount of motion communicated to the link 43. Adjustment may be made so that the fulcrum 33 is close up to the link 43, and with the fulcrum 33 in this position there is virtually no feed, so that several stitches may be taken in the same place at the beginning or end of a seam to fasten the ends of the thread.

We claim as our invention:—

1. In a blind stitching sewing machine, the combination of a table having a substantially plane working surface for the cloth to rest upon during its travel for being sewed, cloth feed rollers whose axes are below and substantially parallel to said surface, and whose peripheries are about on the same level as said surface, and which rollers are for feeding said cloth from said surface, partly around one of said rollers for forming a fold in the cloth to receive the stitching, and then to a position below said table, a needle reciprocating between said rollers, for passing through said cloth, and means for holding said cloth down upon one of said rollers during the stitching of the cloth.

2. In a blind stitching sewing machine, the combination of a longitudinally reciprocating needle, feeding mechanism for feeding the material in the direction of the path of said needle, the location at which the cloth is gripped by the mechanism coinciding substantially with the location at which said cloth is pierced by the needle, a work carrier having a surface for guiding said material transversely to the axis of said needle and towards said mechanism, and guide fingers for directing said material transversely again to said needle and away from said mechanism.

3. In a blind stitching sewing machine, the combination of a longitudinally reciprocating needle, feeding mechanism for feeding the material in the direction of the path of said needle, the location at which the cloth is gripped by the mechanism coinciding substantially with the location at which said cloth is pierced by the needle, a work carrier having a surface for guiding said material transversely to the axis of said needle and towards said mechanism, guide fingers for directing said material transversely again to said needle and away from said mechanism, and a presser foot for pressing said material down upon said work carrier.

4. In a blind stitching sewing machine, the combination with a vertically reciprocating needle, a movable cloth support, a roller carried by said support, a presser foot with a slot, through which slot said needle travels, and pressing upon said roller through the medium of the cloth which passes between said roller and said presser foot, and then to the other side of the roller to form a fold for being pierced by said needle, a feed roller turning the first roller through the action of the cloth as a medium between the two rollers, the said two rollers having their upper portions of their peripheries at about the same level as the top of said support, means for adjusting the first roller upon said support, to vary the distance between the two rollers, and a second support for holding said first support, and having a pivotal connection therewith, so that the first support may be turned to a distance from said feed roller.

5. In a blind stitching sewing machine, the combination of a vertically reciprocating vertical needle, a feed roller whose axis is horizontal and for feeding the material to be worked upon in a vertical direction and which engages the said material substantially at the stitching point, a work carrier having a surface for guiding said material transversely to the axis of said needle and towards said feed roller, and means for directing said material transversely again to said needle and away from said feed roller.

6. In a blind stitching sewing machine, the combination of a vertically reciprocating vertical needle, a feed roller whose axis is horizontal and for feeding the material to be worked upon in a vertical direction and which engages the said material substantially at the stitching point, said roller having an annular portion cut away at its middle in the path of said needle, a work carrier having a surface for guiding said material transversely to the axis of said needle and towards said feed roller, and means for directing said material transversely again to said needle and away from said feed roller.

7. In a blind stitching sewing machine, the combination of a vertically reciprocating vertical needle, a feed roller whose axis is horizontal and for feeding the material to be worked upon in a vertical direction and which engages the said material substantially at the stitching point, said roller having an annular portion cut away at its middle in the path of said needle, and a cloth roller parallel to the feed roller and contiguous to the feed roller and to the needle and around which the said material folds, a work carrier having a surface for guiding said material transversely to the axis of said needle and towards said feed roller, and means for directing said material transversely again to said needle and away from said feed roller.

8. In a blind stitching sewing machine, the combination of a feed roller whose axis is horizontal and for feeding the material to be worked upon in a vertical direction, a cloth roller parallel to and contiguous to the feed roller and whose axis lies approximately in the same horizontal plane as the axis of said feed roller and around which cloth roller the said material may fold and pass between said rollers, and a vertically reciprocating vertical needle whose patch lies between said rollers, said feed roller having an annular portion cut away in the path of said needle, a work carrier having a surface for guiding said material transversely to the axis of said needle and towards said feed roller, and means for directing said material transversely again to said needle and away from said feed roller.

9. In a blind stitching sewing machine, the combination of a feed roller whose axis is horizontal and which is adapted to feed the material to be worked upon in a vertical direction, a cloth roller parallel to and contiguous to the feed roller and whose axis lies approximately in the same horizontal plane as the axis of said feed roller and around which cloth roller the said material may fold and pass between said rollers, a vertically reciprocating vertical needle whose path lies between said rollers, said feed roller having an annular portion cut away in the path of said needle, a shaft upon which said feed roller is secured, and a slide having bearings for and carrying said shaft.

10. In a blind stitching sewing machine, the combination of a feed roller whose axis is horizontal and which is adapted to feed the material to be worked upon in a vertical direction, a cloth roller parallel to and contiguous to the feed roller and whose axis lies approximately in the same horizontal plane as the axis of said feed roller and around which cloth roller the said material may fold and pass between said rollers, a vertically reciprocating vertical needle whose path lies between said rollers, said feed roller having an annular portion cut away in the path of said needle, a shaft upon which said feed roller is secured, a slide having bearings for and carrying said shaft, said feed roller and slide being yieldable in a horizontal direction away from said cloth roller said slide having a check for limiting its movement in each direction, and a spring pressing said slide and feed roller towards said cloth roller.

11. In a blind stitching sewing machine, the combination of a feed roller whose axis is horizontal and which is adapted to feed the material to be worked upon in a vertical direction, a cloth roller parallel to and contiguous to the feed roller and whose axis lies approximately in the same horizontal plane as the axis of said feed roller and around which cloth roller the said material may fold and pass between said rollers, a vertically reciprocating vertical needle whose path lies between said rollers, said feed roller having an annular portion cut away in the path of said needle, a shaft upon which said feed roller is secured, a slide having bearings for and carrying said shaft, said feed roller and slide being yieldable in a horizontal direction away from said cloth roller said slide having a check for limiting its movement in each direction, a spring pressing said slide and feed roller towards said cloth roller, and means for adjusting the tension of said spring.

12. In a blind stitching sewing machine, the combination of a feed roller whose axis is horizontal and which is adapted to feed the material to be worked upon in a vertical direction, a cloth roller parallel to and contiguous to the feed roller and whose axis lies approximately in the same horizontal plane as the axis of said feed roller and around which cloth roller the said material may fold and pass between said rollers, a vertically reciprocating vertical needle whose path lies between said rollers, said feed roller having an annular portion cut away in the path of said needle, a shaft upon which said feed roller is secured, a slide having bearings for and carrying said shaft, said feed roller and slide being yieldable in a horizontal direction away from said cloth roller said slide having a check for limiting its movement in each direction, a spring pressing said slide and feed roller towards said cloth roller, means for adjusting the tension of said spring, a clutch on said shaft, a lever extending downward from said clutch, a driving mechanism, and a substantially horizontal link connecting said lever with said mechanism.

13. In a blind stitching sewing machine, the combination of a feed roller whose axis is horizontal and which is adapted to feed the material to be worked upon in a vertical direction, a cloth roller parallel to and contiguous to the feed roller and whose axis lies approximately in the same horizontal plane as the axis of said feed roller and around which cloth roller the said material may fold and pass between said rollers, a vertically reciprocating vertical needle whose path lies between said rollers, said feed roller having an annular portion cut away in the path of said needle, a shaft upon which said feed roller is secured, a slide having bearings for and carrying said shaft, said feed roller and slide being yieldable in a horizontal direction away from said cloth roller, said slide having a check for limiting its movement in each direction, a spring pressing said slide and feed roller towards said cloth roller, means for adjusting the tension of said spring, a clutch on said shaft, a lever extending downward from said clutch, a driving mechanism, and a substantially horizontal link connecting said lever with said mechanism, said mechanism consisting of a compound lever.

14. In a blind stitching sewing machine, the combination of a feed roller whose axis is horizontal and which is adapted to feed the material to be worked upon in a vertical direction, a cloth roller parallel to and contiguous to the feed roller and whose axis lies approximately in the same horizontal plane as the axis of said feed roller and around which cloth roller the said material may fold and pass between said rollers, a vertically reciprocating vertical needle whose path lies between said rollers, said feed roller having an annular portion cut away in the path of said needle, a shaft upon which said feed roller is secured, a slide having bearings for and carrying said shaft, said feed roller and slide being yieldable in a horizontal direction away from said cloth roller said slide having a check for limiting its movement in each direction, a spring pressing said slide and feed roller towards said cloth roller, means for adjusting the tension of said spring, a bed plate for the machine, said bed plate having guiding surfaces for receiving and guiding said slide, a retaining clip for said slide attached to said bed plate, and a thumb piece secured to the top of said slide.

15. In a blind stitching sewing machine, the combination of a feed roller whose axis is horizontal and which is adapted to feed the material to be worked upon in a vertical direction, a cloth roller parallel to and contiguous to the feed roller and whose axis lies approximately in the same horizontal plane as the axis of said feed roller and around which cloth roller the said material may fold and pass between said rollers, a vertically reciprocating vertical needle whose path lies between said rollers, said feed roller having an annular portion cut away in the path of said needle, a shaft upon which said feed roller is secured, a slide having bearings for and carrying said shaft, said feed roller and slide being yieldable in a horizontal direction away from said cloth roller, said slide having a check for limiting its movement in each direction, a spring pressing said slide and feed roller towards said cloth roller, means for adjusting the tension of said spring, a clutch on said shaft, a lever extending downward from said clutch, a driving mechanism, a substantially horizontal link connecting said lever with said mechanism, a bed plate for the machine, said bed plate having guiding surfaces for receiving and guiding said slide, a retaining clip for said slide attached to said bed plate, and a thumb piece secured to the top of said slide.

16. In a blind stitching sewing machine, the combination of a feed roller whose axis is horizontal and which is adapted to feed the material to be worked upon in a vertical direction, a cloth roller parallel to and contiguous to the feed roller and whose axis lies approximately in the same horizontal plane as the axis of said feed roller and around which cloth roller the said material may fold and pass between said rollers, a vertically reciprocating vertical needle whose path lies between said rollers, said feed roller having an annular portion cut away in the path of said needle, a shaft upon which said feed roller is secured, a slide having bearings for and carrying said shaft, said feed roller and slide being yieldable in a horizontal direction away from said cloth roller, said slide having a check for limiting its movement in each direction, a spring pressing said slide and feed roller towards said cloth roller, means for adjusting the tension of said spring, a clutch on said shaft, a lever extending downward from said clutch, a driving mechanism, a substantially horizontal link connecting said lever with said mechanism, said mechanism consisting of a compound lever, a bed plate for the machine, said bed plate having guiding surfaces for receiving and guiding said slide, a retaining slip for said slide attached to said bed plate, and a thumb piece secured to the top of said slide.

17. In a blind stitching sewing machine, the combination of a feed roller whose axis is horizontal and which is adapted to feed the material to be worked upon in a vertical direction, a cloth roller parallel to and contiguous to the feed roller and whose axis lies approximately in the same horizontal plane as the axis of said feed roller and around which cloth roller the said material may fold and pass between said rollers, a vertically reciprocating vertical needle whose path lies between said rollers, said feed roller having an annular portion cut away in the path of said needle, a shaft upon which said feed roller is secured, a slide having bearings for and carrying said shaft, said feed roller and slide being yieldable in a horizontal direction away from said cloth roller, said slide having a check for limiting its movement in each direction, a spring pressing said slide and feed roller towards said cloth roller, means for adjusting the tension of said spring, said means consisting of a thumb screw, a bearing for said thumb screw attached to said bed plate, and a traveling nut on said thumb screw and engaging said spring.

18. In a blind stitching sewing machine, the combination of a feed roller whose axis is horizontal and which is adapted to feed the material to be worked upon in a vertical direction, a cloth roller parallel to and contiguous to the feed roller and whose axis lies approximately in the same horizontal plane as the axis of said feed roller and around which cloth roller the said material may fold and pass between said rollers, a vertically reciprocating vertical needle whose path lies between said rollers, said feed roller having an annular portion cut away in the path of said needle, a shaft upon which said feed roller is secured, a slide having bearings for and carrying said shaft, said feed roller and slide being yieldable in a horizontal direction away from said cloth roller, said slide having a check for limiting its movement in each direction, a spring pressing said slide and feed roller towards said cloth roller, means for adjusting the tension of said spring, a clutch on said shaft, a lever extending downward from said clutch, a driving mechanism, a substantially horizontal link connecting said lever with said mechanism, said means consisting of a thumb screw, a bearing for said thumb screw attached to said bed plate, and a traveling nut on said thumb screw and engaging said spring.

19. In a blind stitching sewing machine, the combination of a feed roller whose axis is horizontal and which is adapted to feed the material to be worked upon in a vertical direction, a cloth roller parallel to and contiguous to the feed roller and whose axis lies approximately in the same horizontal plane as the axis of said feed roller and around which cloth roller the said material may fold and pass between said rollers, a vertically reciprocating vertical needle whose path lies between said rollers, said feed roller having an annular portion cut away in the path of said needle, a shaft upon which said feed roller is secured, a slide having bearings for and carrying said shaft, said feed roller and slide being yieldable in a horizontal direction away from said cloth roller, said slide having a check for limiting its movement in each direction, a spring pressing said slide and feed roller towards said cloth roller, means for adjusting the tension of said spring, a clutch on said shaft, a lever extending downward from said clutch, a driving mechanism, a substantially horizontal link connecting said lever with said mechanism, said mechanism consisting of a compound lever, said means consisting of a thumb screw, a bearing for said thumb screw attached to said bed plate, and a traveling nut on said thumb screw and engaging said spring.

20. In a blind stitching sewing machine, the combination of a feed roller whose axis is horizontal and which is adapted to feed the material to be worked upon in a vertical direction, a cloth roller parallel to and contiguous to the feed roller and whose axis lies approximately in the same horizontal plane as the axis of said feed roller and around which cloth roller the said material may fold and pass between said rollers, a vertically reciprocating vertical needle whose path lies between said rollers, said feed roller having an annular portion cut away in the path of said needle, a shaft upon which said feed roller is secured, a slide having bearings for and carrying said shaft, said feed roller and slide being yieldable in a horizontal direction away from said cloth roller, said slide having a check for limiting its movement in each direction, a spring pressing said slide and feed roller towards said cloth roller, means for adjusting the tension of said spring, a bed plate for the machine, said bed plate having guiding surfaces for receiving and guiding said slide, a retaining clip for said slide attached to said bed plate, a thumb piece secured to the top of said slide, said means consisting of a thumb screw, a bearing for said thumb screw attached to said bed plate, and a traveling nut on said thumb screw and engaging said spring.

21. In a blind stitching sewing machine, the combination of a feed roller whose axis is horizontal and which is adapted to feed the material to be worked upon in a vertical direction, a cloth roller parallel to and contiguous to the feed roller and whose axis lies approximately in the same horizontal plane as the axis of said feed roller and around which cloth roller the said material may fold and pass between said rollers, a vertically reciprocating vertical needle whose path lies between said rollers, said feed roller having an annular portion cut away in the path of said needle, a shaft upon which said feed roller is secured, a slide having bearings for and carrying said shaft, said feed roller and slide being yieldable in a horizontal direction away from said cloth roller, said slide having a check for limiting its movement in each direction, a spring pressing said slide and feed roller towards said cloth roller, means for adjusting the tension of said spring, a clutch on said shaft, a lever extending downward from said clutch, a driving mechanism, a substantially horizontal link connecting said lever with said mechanism, a bed plate for the machine, said bed plate having guiding surfaces for receiving and guiding said slide, a retaining clip for said slide attached to said bed plate, a thumb piece secured to the top of said slide, said means consisting of a thumb screw, a bearing for said thumb screw attached to said bed plate, and a traveling nut on said thumb screw and engaging said spring.

22. In a blind stitching sewing machine, the combination of a feed roller whose axis is horizontal and which is adapted to feed the material to be worked upon in a vertical direction, a cloth roller parallel to and contiguous to the feed roller and whose axis lies approximately in the same horizontal plane as the axis of said feed roller and around which cloth roller the said material may fold and pass between said rollers, a vertically reciprocating vertical needle whose path lies between said rollers, said feed roller having an annular portion cut away in the path of said needle, a shaft upon which said feed roller is secured, a slide having bearings for and carrying said shaft, said feed roller and slide being yieldable in a horizontal direction away from said cloth roller, said slide having a check for limiting its movement in each direction, a spring pressing said slide and feed roller towards said cloth roller, means for adjusting the tension of said spring, a clutch on said shaft, a lever extending downward from said clutch, a driving mechanism, a substantially horizontal link connecting said lever with said mechanism, said mechanism consisting of a compound lever, a bed plate for the machine, said bed plate having guiding surfaces for receiving and guiding said slide, a retaining clip for said slide attached to said bed plate, a thumb piece secured to the top of said slide, said means consisting of a thumb screw, a bearing for said thumb screw attached to said bed plate, and a traveling nut on said thumb screw and engaging said spring.

23. In a blind stitching sewing machine, the combination of a feed roller whose axis is horizontal and which is adapted to feed the material to be worked upon in a vertical direction, a cloth roller parallel to and contiguous to the feed roller and whose axis lies approximately in the same horizontal plane as the axis of said feed roller and around which cloth roller the said material may fold and pass between said rollers, a vertically reciprocating vertical needle whose path lies between said rollers, said feed roller having an annular portion cut away in the path of said needle, a bed plate for the machine, a cloth plate to one edge of which said cloth roller is attached, a horizontally swinging work carrier pivoted to said bed plate, said cloth plate being mounted on said work carrier and adjustable thereon to and from said needle, a vertical fulcrum for said work carrier, a stop for limiting the inward movement of said carrier, and a latch for locking said carrier in operative position.

24. In a blind stitching sewing machine, the combination of a feed roller whose axis is horizontal and which is adapted to feed the material to be worked upon in a vertical direction, a cloth roller parallel to and contiguous to the feed roller and whose axis lies approximately in the same horizontal plane as the axis of said feed roller and around which cloth roller the said material may fold and pass between said rollers, a vertically reciprocating vertical needle whose path lies between said rollers, said feed roller having an annular portion cut away in the path of said needle, a bed plate for the machine, a cloth plate to one edge of which said cloth roller is attached, a horizontally swinging work carrier pivoted to said bed plate, said cloth plate being mounted on said work carrier and adjustable thereon to and from said needle, a stop for limiting the inward movement of said carrier, a latch for locking said carrier in operative position, said work carrier having a transverse undercut depression on its upper surface, said cloth plate being seated and guided in said depression and the upper surface of said cloth plate being flush with the upper surface of said work carrier, said carrier having a transverse slot therethrough and said cloth plate having an opening therethrough registering with said slot, a screw fixed transversely in said carrier and traversing said slot, and a thumb nut movable on said screw in said slot and engaging said cloth plate at said opening.

25. In a blind stitching sewing machine, the combination of a feed roller whose axis is horizontal and which is adapted to feed the material to be worked upon in a vertical direction, a cloth roller parallel to and contiguous to the feed roller and whose axis lies approximately in the same horizontal plane as the axis of said feed roller and around which cloth roller the said material may fold and pass between said rollers, a vertically reciprocating vertical needle whose path lies between said rollers, said feed roller having an annular portion cut away in the path of said needle, a shaft upon which said feed roller is secured, a slide having bearings for and carrying said shaft, said feed roller and slide being yieldable in a horizontal direction away from said cloth roller said slide having a check for limiting its movement in each direction, a spring pressing said slide and feed roller towards said cloth roller, means for adjusting the tension of said spring, a clutch on said shaft, a lever extending downward from said clutch, a driving mechanism, a substantially horizontal link connecting said lever with said mechanism, a bed plate for the machine, a cloth plate to one edge of which said cloth roller is attached, a horizontally swinging work carrier pivoted to said bed plate, said cloth plate being mounted on said work carrier and adjustable thereon to and from said needle, a vertical pivot for said work carrier, a stop for limiting the inward movement of said carrier, and a latch for locking said carrier in operative position.

26. In a blind stitching sewing machine, the combination of a feed roller whose axis is horizontal and which is adapted to feed the material to be worked upon in a vertical direction, a cloth roller parallel to and contiguous to the feed roller and whose axis lies approximately in the same horizontal plane as the axis of said feed roller and around which cloth roller the said material may fold and pass between said roller, a vertically reciprocating vertical needle whose path lies between said rollers, said feed roller having an annular portion cut away in the path of said needle, a shaft upon which said feed roller is secured, a slide having bearings for and carrying said shaft, said feed roller and slide being yieldable in a horizontal direction away from said cloth roller, said slide having a check for limiting its movement in each direction, a spring pressing said slide and feed roller towards said cloth roller, means for adjusting the tension of said spring, a clutch on said shaft, a lever extending downward from said clutch, a driving mechanism, a substantially horizontal link connecting said lever with said mechanism, a bed plate for the machine, a cloth plate to one edge of which said cloth roller is attached, a horizontally swinging work carrier pivoted to said bed plate, said cloth plate being mounted on said work carrier and adjustable thereon to and from said needle, a vertical fulcrum for said work carrier, a stop for limiting the inward movement of said carrier, a latch for locking said carrier in operative position, said work carrier having a transverse undercut depression on its upper surface, said cloth plate being seated and guided in said depression and the upper surface of said cloth plate being flush with the upper surface of said work carrier, said carrier having a transverse slot therethrough and said cloth plate having an opening therethrough registering with said slot, a screw fixed transversely in said carrier and transversing said slot, and a thumb nut movable on said screw in said slot and engaging said cloth plate at said opening.

27. In a blind stitching sewing machine, the combination of a feed roller whose axis is horizontal and which is adapted to feed the material to be worked upon in a vertical direction, a cloth roller parallel to and contiguous to the feed roller and whose axis lies approximately in the same horizontal plane as the axis of said feed roller and around which cloth roller the said material may fold and pass between said rollers, a vertically reciprocating vertical needle whose path lies between said rollers, said feed roller having an annular portion cut away in the path of said needle, a shaft upon which said feed roller is secured, a slide having bearings for and carrying said shaft, said feed roller and slide being yieldable in a horizontal direction away from said cloth roller, said slide having a check for limiting its movement in each direction, a spring pressing said slide and feed roller toward said cloth roller, means for adjusting the tension of said spring, a clutch on said shaft, a lever extending downward from said clutch, a driving mechanism, a substantially horizontal link connecting said lever with said mechanism, said mechanism consisting of a compound lever, a bed plate for the machine, said bed plate having guiding surfaces for receiving and guiding said slide, a retaining clip for said slide attached to said bed plate, a thumb piece secured to the top of said slide, said means consisting of a thumb screw, a bearing for said thumb screw attached to said bed plate, and a traveling nut on said thumb screw and engaging said spring, a cloth plate to one edge of which said cloth roller is attached, a horizontally swinging work carrier pivoted to said bed plate, said cloth plate being mounted on said work carrier and adjustable thereon to and from said needle, a vertical pivot for said work carrier, a stop for limiting the inward movement of said carrier, and a latch for locking said carrier in operative position.

28. In a blind stitching sewing machine, the combination of a feed roller whose axis is horizontal and which is adapted to feed the material to be worked upon in a vertical direction, a cloth roller parallel to and contiguous to the feed roller and whose axis lies approximately in the same horizontal plane as the axis of said feed roller and around which cloth roller the said material may fold and pass between said rollers, a vertically reciprocating vertical needle whose path lies between said rollers, said feed roller having an annular portion cut away in the path of said needle, a shaft upon which said feed roller is secured, a slide having bearings for and carrying said shaft, said feed roller and slide being yieldable in a horizontal direction away from said cloth roller, said slide having a check for limiting its movement in each direction, a spring pressing said slide and feed roller toward said cloth roller, means for adjusting the tension of said spring, a clutch on said shaft, a lever extending downward from said clutch, a driving mechanism, a substantially horizontal link connecting said lever with said mechanism, said mechanism consisting of a compound lever, a bed plate for the machine, said bed plate having guiding surfaces for receiving and guiding said slide, a retaining clip for said slide attached to said bed plate, a thumb piece secured to the top of said slide, said means consisting of a thumb screw, a bearing for said thumb screw attached to said bed plate, and a traveling nut on said thumb screw and engaging said spring, a cloth plate to one edge of which said cloth roller is attached, a horizontally swinging work carrier pivoted to said bed plate, said cloth plate being mounted on said work carrier and adjustable thereon to and from said needle, a vertical pivot for said work carrier, a stop for limiting the inward movement of said carrier, a latch for locking said carrier in operative position, said work carrier having a transverse undercut depression on its upper surface, said cloth plate being seated and guided in said depression and the upper surface of said cloth plate being flush with the upper surface of said work carrier, said carrier having a transverse slot therethrough and said cloth plate having an opening therethrough registering with said slot, a screw fixed transversely in said carrier and traversing said slot, and a thumb nut movable on said screw in said slot and engaging said cloth plate at said opening.

29. In a blind stitching sewing machine, the combination of a feed roller whose axis is horizontal and which is adapted to feed the material to be worked upon in a vertical direction, a cloth roller parallel to and contiguous to the feed roller and whose axis lies approximately in the same horizontal plane as the axis of said feed roller and around which cloth roller the said material may fold and pass between said rollers, a vertically reciprocating vertical needle whose path lies between said rollers, said feed roller having an annular portion cut away in the path of said needle, said feed roller having annular grooves therein, and cloth-guiding fingers lying in said grooves and extending downwardly and outwardly.

30. In a blind stitching sewing machine, the combination of a feed roller whose axis is horizontal and which is adapted to feed the material to be worked upon in a vertical direction, a cloth roller parallel to and contiguous to the feed roller and whose axis lies approximately in the same horizontal plane as the axis of said feed roller and around which cloth roller the said material may fold and pass between said rollers, a vertically reciprocating vertical needle whose path lies between said rollers, said feed roller having an annular portion cut away in the path of said needle, a shaft upon which said feed roller is secured, a slide having bearings for and carrying said shaft, said feed roller having annular grooves therein, and cloth-guiding fingers lying in said grooves and extending downwardly and outwardly, said fingers being carried by said slide.

31. In a blind stitching sewing machine, the combination of a feed roller whose axis is horizontal and which is adapted to feed the material to be worked upon in a vertical direction, a cloth roller parallel to and contiguous to the feed roller and whose axis lies approximately in the same horizontal plane as the axis of said feed roller and around which cloth roller the said material may fold and pass between said rollers, a vertically reciprocating vertical needle whose path lies between said rollers, said feed roller having an annular portion cut away in the path of said needle, a shaft upon which said feed roller is secured, a slide having bearings for and carrying said shaft, said feed roller and slide being yieldable in a horizontal direction away from said cloth roller, said slide having a check for limiting its movement in each direction, a spring pressing said slide and feed roller towards said cloth roller, said feed roller having annular grooves therein, and cloth-guiding fingers lying in said grooves and extending downwardly and outwardly, said fingers being carried by said slide.

32. In a blind stitching sewing machine, the combination of a feed roller whose axis is horizontal and which is adapted to feed the material to be worked upon in a vertical direction, a cloth roller parallel to and contiguous to the feed roller and whose axis lies approximately in the same horizontal plane as the axis of said feed roller and around which cloth roller the said material may fold and pass between said rollers, a vertically reciprocating vertical needle whose path lies between said rollers, said feed roller having an annular portion cut away in the path of said needle, a shaft upon which said feed roller is secured, a slide having bearings for and carrying said shaft, said feed roller and slide being yieldable in a horizontal direction away from said cloth roller, said slide having a check for limiting its movement in each direction, a spring pressing said slide and feed roller towards said cloth roller, means for adjusting the tension of said spring, said feed roller having annular grooves therein, and cloth-guiding fingers lying in said groove and extending downwardly and outwardly, said fingers being carried by said slide.

33. In a blind stitching sewing machine, the combination of a feed roller whose axis is horizontal and which is adapted to feed the material to be worked upon in a vertical direction, a cloth roller parallel to and contiguous to the feed roller and whose axis lies approximately in the same horizontal plane as the axis of said feed roller and around which cloth roller the said material may fold and pass between said rollers, a vertically reciprocating vertical needle whose path lies between said rollers, said feed roller having an annular portion cut away in the path of said needle, a shaft upon which said feed roller is secured, a slide having bearings for and carrying said shaft, said feed roller and slide being yieldable in a horizontal direction away from said cloth roller, said slide having a check for limiting its movement in each direction, a spring pressing said slide and feed roller toward said cloth roller, means for adjusting the tension of said spring, a clutch on said shaft, a lever extending downward from said clutch, a driving mechanism, a substantially horizontal link connecting said lever with said mechanism, said feed roller having annular grooves therein, and cloth-guiding fingers lying in said grooves and extending downwardly and outwardly, said fingers being carried by said slide.

34. In a blind stitching sewing machine, the combination of a feed roller whose axis is horizontal and which is adapted to feed the material to be worked upon in a vertical direction, a cloth roller parallel to and contiguous to the feed roller and whose axis lies approximately in the same horizontal plane as the axis of said feed roller and around which cloth roller the said material may fold and pass between said rollers, a vertically reciprocating vertical needle whose path lies between said rollers, said feed roller having an annular portion cut away in the path of said needle, a shaft upon which said feed roller is secured, a slide having bearings for and carrying said shaft, said feed roller and slide being yieldable in a horizontal direction away from said cloth roller, said slide having a check for limiting its movement in each direction, a spring pressing said slide and feed roller towards said cloth roller, means for adjusting the tension of said spring, a clutch on said shaft, a lever extending downward from said clutch, a driving mechanism, a substantially horizontal link connecting said lever with said mechanism, said mechanism consisting of a compound lever, said feed roller having annular grooves therein, and cloth-guiding fingers lying in said grooves and extending downwardly and outwardly, said fingers being carried by said slide.

35. In a blind stitching sewing machine, the combination of a feed roller whose axis is horizontal and which is adapted to feed the material to be worked upon in a vertical direction, a cloth roller parallel to and contiguous to the feed roller and whose axis lies approximately in the same horizontal plane as the axis of said feed roller and around which cloth roller the said material may fold and pass between said rollers, a vertically reciprocating vertical needle whose path lies between said rollers, said feed roller having an annular portion cut away in the path of said needle, a bed plate for the machine, a cloth plate to one edge of which said cloth roller is attached, a horizontally swinging work carrier pivoted on said bed plate, said cloth plate being mounted on said work carrier and adjustable thereon to and from said needle, a vertical pivot for said work carrier, a stop for limiting the inward movement of said carrier, a latch for locking said carrier in operative position, said feed roller having annular grooves therein, and cloth-guiding fingers lying in said grooves and extending downwardly and outwardly, said fingers being carried by said slide.

36. In a blind stitching sewing machine, the combination of a feed roller whose axis is horizontal and which is adapted to feed the material to be worked upon in a vertical direction, a cloth roller parallel to and contiguous to the feed roller and whose axis lies approximately in the same horizontal plane as the axis of said feed roller and around which cloth roller the said material may fold and pass between said rollers, a vertically reciprocating vertical needle whose path lies between said rollers, said feed roller having an annular portion cut away in the path of said needle, a shaft upon which said feed roller is secured, a slide having bearings for and carrying said shaft, said feed roller and slide being yieldable in a horizontal direction away from said cloth roller, said slide having a check for limiting its movement in each direction, a spring pressing said slide and feed roller towards said cloth roller, means for adjusting the tension of said spring, a clutch on said shaft, a lever extending downward from said clutch, a driving mechanism, a substantially horizontal link connecting said lever with said mechanism, a bed plate for the machine, a cloth plate to one edge of which said cloth roller is attached, a horizontally swinging work carrier pivoted on said bed plate, said cloth plate being mounted on said work carrier and adjustable thereon to and from said needle, a vertical pivot for said work carrier, a stop for limiting the inward movement of said carrier, a latch for locking said carrier in operative position, said feed roller having annular grooves therein, and cloth-guiding fingers lying in said grooves and extending downwardly and outwardly, said fingers being carried by said slide.

37. In a blind stitching sewing machine, the combination of a feed roller whose axis is horizontal and which is adapted to feed the material to be worked upon in a vertical direction, a cloth roller parallel to and contiguous to the feed roller and whose axis lies approximately in the same horizontal plane as the axis of said feed roller and around which cloth roller the said material may fold and pass between said rollers, a vertically reciprocating vertical needle whose path lies between said rollers, said feed roller having an annular portion cut away in the path of said needle, a shaft upon which said feed roller is secured, a slide having bearings for and carrying said shaft, said feed roller and slide being yieldable in a horizontal direction away from said cloth roller, said slide having a check for limiting its movement in each direction, a spring pressing said slide and feed roller towards said cloth roller, means for adjusting the tension of said spring, a clutch on said shaft, a lever extending downward from said clutch, a driving mechanism, a substantially horizontal link connecting said lever with said mechanism, said mechanism consisting of a compound lever, a bed plate for the machine, said bed plate having guiding surfaces for receiving and guiding said slide, a retaining clip for said slide attached to said bed plate, a thumb piece secured to the top of said slide, said means consisting of a thumb screw, a bearing for said thumb screw attached to said bed plate, and a traveling nut on said thumb screw and engaging said spring, a cloth plate to one edge of which said cloth roller is attached, a horizontally swinging work carrier pivoted on said bed plate, said cloth plate being mounted on said work carrier and adjustable thereon to and from said needle, a vertical pivot for said work carrier, a stop for limiting the inward movement of said carrier, a latch for locking said carrier in operative position, said feed roller having annular grooves therein, and cloth-guiding fingers lying in said grooves and extending downwardly and outwardly, said fingers being carried by said slide.

38. In a blind stitching sewing machine, the combination of a feed roller whose axis is horizontal and which is adapted to feed the material to be worked upon in a vertical direction, a cloth roller parallel to and contiguous to the feed roller and whose axis lies approximately in the same horizontal plane as the axis of said feed roller and around which cloth roller the said material may fold and pass between said rollers, a vertically reciprocating vertical needle whose path lies between said rollers, said feed roller having an annular portion cut away in the path of said needle, a shaft upon which said feed roller is secured, a slide having bearings for and carrying said shaft, said feed roller and slide being yieldable in a horizontal direction away from said cloth roller, said slide having a check for limiting its movement in each direction, a spring pressing said slide and feed roller towards said cloth roller, means for adjusting the tension of said spring, a bed plate for the machine, said bed plate having guiding surfaces for receiving and guiding said slide, a retaining clip for said slide attached to said bed plate, a thumb piece secured to the top of said slide, said means consisting of a thumb screw, a bearing for said thumb screw attached to said bed plate, and a traveling nut on said thumb screw and engaging said spring, said feed roller having annular grooves therein, cloth-guiding fingers lying in said grooves and extending downwardly and outwardly, said fingers being carried by said slide, said slide having a depressed seat in its upper surface and adjoining said feed roller, and a plate secured in said seat, the upper ends of said fingers being attached to said plate.

39. In a blind stitching sewing machine, the combination of a feed roller whose axis is horizontal and which is adapted to feed the material to be worked upon in a vertical direction, a cloth roller parallel to and contiguous to the feed roller and whose axis lies approximately in the same horizontal plane as the axis of said feed roller and around which cloth roller the said material may fold and pass between said rollers, a vertically reciprocating vertical needle whose path lies between said rollers, said feed roller having an annular portion cut away in the path of said needle, a shaft upon which said feed roller is secured, a slide having bearings for and carrying said shaft, said feed roller and slide being yieldable in a horizontal direction away from said cloth roller, said slide having a check for limiting its movement in each direction, a spring pressing said slide and feed roller towards said cloth roller, means for adjusting the tension of said spring, a clutch on said shaft, a lever extending downward from said clutch, a driving mechanism, a substantially horizontal link connecting said lever with said mechanism, a bed plate for the machine, said bed plate having guiding surfaces for receiving and guiding said slide, a retaining clip for said slide attached to said bed plate, a thumb piece secured to the top of said slide, said means consisting of a thumb screw, a bearing for said thumb screw attached to said bed plate, and a traveling nut on said thumb screw and engaging said spring, said feed roller having annular grooves therein, cloth-guiding fingers lying in said grooves and extending downwardly and outwardly, said fingers being carried by said slide, said slide having a depressed seat in its upper surface and adjoining said feed roller, and a plate secured in said seat, the upper ends of said fingers being attached to said plate.

40. In a blind stitching sewing machine, the combination of a feed roller whose axis is horizontal and which is adapted to feed the material to be worked upon in a vertical direction, a cloth roller parallel to and contiguous to the feed roller and whose axis lies approximately in the same horizontal plane as the axis of said feed roller and around which cloth roller the said material may fold and pass between said rollers, a vertically reciprocating vertical needle whose path lies between said rollers, said feed roller having an annular portion cut away in the path of said needle, a shaft upon which said feed roller is secured, a slide having bearings for and carrying said shaft, said feed roller and slide being yieldable in a horizontal direction away from said cloth roller, said slide having a check for limiting its movement in each direction, a spring pressing said slide and feed roller towards said cloth roller, means for adjusting the tension of said spring, a clutch on said shaft, a lever extending downward from said clutch, a driving mechanism, a substantially horizontal link connecting said lever with said mechanism, said mechanism consisting of a compound lever, a bed plate for the machine, said bed plate having guiding surfaces for receiving and guiding said slide, a retaining clip for said slide attached to said bed plate, a thumb piece secured to the top of said slide, said means consisting of a thumb screw, a bearing for said thumb screw attached to said bed plate, and a traveling nut on said thumb screw and engaging said spring, said feed roller having annular grooves therein, cloth-guiding fingers lying in said grooves and extending downwardly and outwardly, said fingers being carried by said slide, said slide having a depressed seat in its upper surface and adjoining said feed roller, and a plate secured in said seat, the upper ends of said fingers being attached to said plate.

41. In a blind stitching sewing machine, the combination of a feed roller whose axis is horizontal and which is adapted to feed the material to be worked upon in a vertical direction, a cloth roller parallel to and contiguous to the feed roller and whose axis lies approximately in the same horizontal plane as the axis of said feed roller and around which cloth roller the said material may fold and pass between said rollers, a vertically reciprocating vertical needle whose path lies between said rollers, said feed roller having an annular portion cut away in the path of said needle, a bed plate for the machine, a cloth plate to one edge of which said cloth roller is attached, a horizontally swinging work carrier pivoted on said bed plate, said cloth plate being mounted on said work carrier and adjustable thereon to and from said needle, a vertical pivot for said work carrier, a stop for limiting the inward movement of said carrier, a latch for locking said carrier in operative position, said work carrier having a transverse undercut depression on its upper surface, said cloth plate being seated and guided in said depression and the upper surface of said cloth plate being flush with the upper surface of said work carrier, said carrier having a transverse slot therethrough and said cloth plate having an opening therethrough registering with said slot, a screw fixed transversely in said carrier and traversing said slot, a thumb nut movable on said screw in said slot and engaging said cloth plate at said opening, said feed roller having annular grooves therein, cloth-guiding fingers lying in said grooves and extending downwardly and outwardly, said fingers being carried by said slide, said slide having a depressed seat in its upper surface and adjoining said feed roller, and a plate secured in said seat, the upper ends of said fingers being attached to said plate.

42. In a blind stitching sewing machine, the combination of a feed roller whose axis is horizontal and which is adapted to feed the material to be worked upon in a vertical direction, a cloth roller parallel to and contiguous to the feed roller and whose axis lies approximately in the same horizontal plane as the axis of said feed roller and around which cloth roller the said material may fold and pass between said rollers, a vertically reciprocating vertical needle whose path lies between said rollers, said feed roller having an annular portion cut away in the path of said needle, a shaft upon which said feed roller is secured, a slide having bearings for and carrying said shaft, said feed roller and slide being yieldable in a horizontal direction away from said cloth roller, said slide having a check for limiting its movement in each direction, a spring pressing said slide and feed roller towards said cloth roller, means for adjusting the tension of said spring, a clutch on said shaft, a lever extending downward from said clutch, a driving mechanism, a substantially horizontal link connecting said lever with said mechanism, a bed plate for the machine, a cloth plate to one edge of which said cloth roller is attached, a horizontally swinging work carrier pivoted on said bed plate, said cloth plate being mounted on said work carrier and adjustable thereon to and from said needle, a vertical pivot for said work carrier, a stop for limiting the inward movement of said carrier, a latch for locking said carrier in operative position, said work carrier having a transverse undercut depression on its upper surface, said cloth plate being seated and guided in said depression and the upper surface of said cloth plate being flush with the upper surface of said work carrier, said carrier having a transverse slot therethrough and said cloth plate having an opening therethrough registering with said slot, a screw fixed transversely in said carrier and traversing said slot, a thumb nut movable on said screw in said slot and engaging said cloth plate at said opening, said feed roller having annular grooves therein, cloth-guiding fingers lying in said grooves and extending downwardly and outwardly, said fingers being carried by said slide, said slide having a depressed seat in its upper surface and adjoining said feed roller, and a plate secured in said seat, the upper ends of said fingers being attached to said plate.

43. In a blind stitching sewing machine, the combination of a vertically reciprocating vertical needle, a feed roller whose axis is horizontal, and a cloth roller parallel to the feed roller and contiguous to the feed roller and to the needle and around which the material to be worked upon may fold and pass between said rollers, and guide fingers for continuously directing said material transversely to said needle.

44. In a blind stitching sewing machine, the combination of a feed roller whose axis is horizontal and which is adapted to feed the material to be worked upon in a vertical direction, a cloth roller parallel to and contiguous to the feed roller and whose axis lies approximately in the same horizontal plane as the axis of said feed roller and around which cloth roller the said material may fold and pass between said rollers, a vertically reciprocating vertical needle whose path lies between said rollers, said feed roller having an annular portion cut away in the path of said needle, and a presser foot above said cloth roller and adapted to press said material down thereupon.

45. In a blind stitching sewing machine, the combination of a feed roller whose axis is horizontal and which is adapted to feed the material to be worked upon in a vertical direction, a cloth roller parallel to and contiguous to the feed roller and whose axis lies approximately in the same horizontal plane as the axis of said feed roller and around which cloth roller the said material may fold and pass between said rollers, a vertically reciprocating vertical needle whose path lies between said rollers, said feed roller having an annular portion cut away in the path of said needle, a shaft upon which said feed roller is secured, a slide having bearings for and carrying said shaft, said feed roller and slide being yieldable in a horizontal direction away from said cloth roller, said slide having a check for limiting its movement in each direction, a spring pressing said slide and feed roller towards said cloth roller, and a presser foot above said cloth roller and adapted to press said material down thereupon.

46. In a blind stitching sewing machine, the combination of a feed roller whose axis is horizontal and which is adapted to feed the material to be worked upon in a vertical direction, a cloth roller parallel to and contiguous to the feed roller and whose axis lies approximately in the same horizontal plane as the axis of said feed roller and around which cloth roller the said material may fold and pass between said rollers, a vertically reciprocating vertical needle whose path lies between said rollers, said feed roller having an annular portion cut away in the path of said needle, a shaft upon which said feed roller is secured, a slide having bearings for and carrying said shaft, said feed roller and slide being yieldable in a horizontal direction away from said cloth roller, said slide having a check for limiting its movement in each direction, a spring pressing said slide and feed roller towards said cloth roller, means for adjusting the tension of said spring, a clutch on said shaft, a lever extending downward from said clutch, a driving mechanism, a substantially horizontal link connecting said lever with said mechanism, and a presser foot above said cloth roller and adapted to press said material down thereupon.

47. In a blind stitching sewing machine, the combination of a feed roller whose axis is horizontal and which is adapted to feed the material to be worked upon in a vertical direction, a cloth roller parallel to and contiguous to the feed roller and whose axis lies approximately in the same horizontal plane as the axis of said feed roller and around which cloth roller the said material may fold and pass between said rollers, a vertically reciprocating vertical needle whose path lies between said rollers, said feed roller having an annular portion cut away in the path of said needle, a shaft upon which said feed roller is secured, a slide having bearings for and carrying said shaft, said feed roller and slide being yieldable in a horizontal direction away from said cloth roller, said slide having a check for limiting its movement in each direction, a spring pressing said slide and feed roller towards said cloth roller, means for adjusting the tension of said spring, said means consisting of a thumb screw, a bearing for said thumb screw attached to said bed plate, and a traveling nut on said thumb screw and engaging said spring, and a presser foot above said cloth roller and adapted to press said material down thereupon.

48. In a blind stitching sewing machine, the combination of a feed roller whose axis is horizontal and which is adapted to feed the material to be worked upon in a vertical direction, a cloth roller parallel to and contiguous to the feed roller and whose axis lies approximately in the same horizontal plane as the axis of said feed roller and around which cloth roller the said material may fold and pass between said rollers, a vertically reciprocating vertical needle whose path lies between said rollers, said feed roller having an annular portion cut away in the path of said needle, a shaft upon which said feed roller is secured, a slide having bearings for and carrying said shaft, said feed roller and slide being yieldable in a horizontal direction away from said cloth roller, said slide having a check for limiting its movement in each direction, a spring pressing said slide and feed roller towards said cloth roller, means for adjusting the tension of said spring, a clutch on said shaft, a lever extending downward from said clutch, a driving mechanism, a substantially horizontal link connecting said lever with said mechanism, said means consisting of a thumb screw, a bearing for said thumb screw attached to said bed plate, and a traveling nut on said thumb screw and engaging said spring, and a presser foot above said cloth roller and adapted to press said material down thereupon.

49. In a blind stitching sewing machine, the combination of a feed roller whose axis is horizontal and which is adapted to feed the material to be worked upon in a vertical direction, a cloth roller parallel to and contiguous to the feed roller and whose axis lies approximately in the same horizontal plane as the axis of said feed roller and around which cloth roller the said material may fold and pass between said rollers, a vertically reciprocating vertical needle whose path lies between said rollers, said feed roller having an annular portion cut away in the path of said needle, a shaft upon which said feed roller is secured, a slide having bearings for and carrying said shaft, said feed roller and slide being yieldable in a horizontal direction away from said cloth roller, said slide having a check for limiting its movement in each direction, a spring pressing said slide and feed roller towards said cloth roller, means for adjusting the tension of said spring, a bed plate for the machine, said bed plate having guiding surfaces for receiving and guiding said slide, a retaining clip for said slide attached to said bed plate, a thumb piece secured to the top of said slide, said means consisting of a thumb screw, a bearing for said thumb screw attached to said bed plate, and a traveling nut on said thumb screw and engaging said spring, and a presser foot above said cloth roller and adapted to press said material down thereupon 50. In a blind stitching sewing machine, the combination of a feed roller whose axis is horizontal and which is adapted to feed the material to be worked upon in a vertical direction, a cloth roller parallel to and contiguous to the feed roller and whose axis lies approximately in the same horizontal plane as the axis of said feed roller and around which cloth roller the said material may fold and pass between said rollers, a vertically reciprocating vertical needle whose path lies between said rollers, said feed roller having an annular portion cut away in the path of said needle, a shaft upon which said feed roller is secured, a slide having bearings for and carrying said shaft, said feed roller and slide being yieldable in a horizontal direction away from said cloth roller, said slide having a check for limiting its movement in each direction, a spring pressing said slide and feed roller towards said cloth roller, means for adjusting the tension of said spring, a clutch on said shaft, a lever extending downward from said clutch, a driving mechanism, a substantially horizontal link connecting said lever with said mechanism, a bed plate for the machine, said bed plate having guiding surfaces for receiving and guiding said slide, a retaining clip for said slide attached to said bed plate, a thumb piece secured to the top of said slide, said means consisting of a thumb screw, a bearing for said thumb screw attached to said bed plate, and a traveling nut on said thumb screw and engaging said spring, and a presser foot above said cloth roller and adapted to press said material down thereupon.

51. In a blind stitching sewing machine, the combination of a feed roller whose axis is horizontal and which is adapted to feed the material to be worked upon in a vertical direction, a cloth roller parallel to and contiguous to the feed roller and whose axis lies approximately in the same horizontal plane as the axis of said feed roller and around which cloth roller the said material may fold and pass between said rollers, a vertically reciprocating vertical needle whose path lies between said rollers, said feed roller having an annular portion cut away in the path of said needle, a bed plate for the machine, a cloth plate to one edge of which said cloth roller is attached, a horizontally swinging work carrier pivoted on said bed plate, said cloth plate being mounted on said work carrier and adjustable thereon to and from said needle, a vertical pivot for said work carrier, a stop for limiting the inward movement of said carrier, a latch for locking said carrier in operative position, and a presser foot above said cloth roller and adapted to press said material down thereupon.

52. In a blind stitching sewing machine, the combination of a feed roller whose axis is horizontal and which is adapted to feed the material to be worked upon in a vertical direction, a cloth roller parallel to and contiguous to the feed roller and whose axis lies approximately in the same horizontal plane as the axis of said feed roller and around which cloth roller the said material may fold and pass between said rollers, a vertically reciprocating vertical needle whose path lies between said rollers, said feed roller having an annular portion cut away in the path of said needle, a shaft upon which said feed roller is secured, a slide having bearings for and carrying said shaft, said feed roller and slide being yieldable in a horizontal direction away from said cloth roller, said slide having a check for limiting its movement in each direction, a spring pressing said slide and feed roller toward said cloth roller, means for adjusting the tension of said spring, a clutch on said shaft, a lever extending downward from said clutch, a driving mechanism, a substantially horizontal link connecting said lever with said mechanism, a bed plate for the machine, a cloth plate to one edge of which said cloth roller is attached, a horizontally swinging work carrier pivoted on said bed plate, said cloth plate being mounted on said work carrier and adjustable thereon to and from said needle, a vertical pivot for said work carrier, a stop for limiting the inward movement of said carrier, a latch for locking said carrier in operative position, and a presser foot above said cloth roller and adapted to press said material down thereupon.

53. In a blind stitching sewing machine, the combination of a feed roller whose axis is horizontal and which is adapted to feed the material to be worked upon in a vertical direction, a cloth roller parallel to and contiguous to the feed roller and whose axis lies approximately in the same horizontal plane as the axis of said feed roller and around which cloth roller the said material may fold and pass between said rollers, a vertically reciprocating vertical needle whose path lies between said rollers, said feed roller having an annular portion cut away in the path of said needle, a shaft upon which said feed roller is secured, a slide having bearings for and carrying said shaft, said feed roller and slide being yieldable in a horizontal direction away from said cloth roller, said slide having a check for limiting its movement in each direction, a spring pressing said slide and feed roller towards said cloth roller, means for adjusting the tension of said spring, a clutch on said shaft, a lever extending downward from said clutch, a driving mechanism, a substantially horizontal link connecting said lever with said mechanism, said mechanism consisting of a compound lever, a bed plate for the machine, said bed plate having guiding surfaces for receiving and guiding said slide, a retaining clip for said slide attached to said bed plate, a thumb piece secured to the top of said slide, said means consisting of a thumb screw, a bearing for said thumb screw attached to said bed plate, and a traveling nut on said thumb screw and engaging said spring, a cloth plate to one edge of which said cloth roller is attached, a horizontally swinging work carrier pivoted on said bed plate, said cloth plate being mounted on said work carrier and adjustable thereon to and from said needle, a vertical pivot for said work carrier, a stop for limiting the inward movement of said carrier, a latch for locking said carrier in operative position, said work carrier having a transverse undercut depression on its upper surface, said cloth plate being seated and guided in said depression and the upper surface of said cloth plate being flush with the upper surface of said work carrier, said carrier having a transverse slot therethrough and said cloth plate having an opening therethrough registering with said slot, a screw fixed transversely in said carrier and traversing said slot, a thumb nut movable on said screw in said slot and engaging said cloth plate at said opening, and a presser foot above said cloth roller and adapted to press said material down thereupon.

54. In a blind stitching sewing machine, the combination of a feed roller whose axis is horizontal and which is adapted to feed the material to be worked upon in a vertical direction, a cloth roller parallel to and contiguous to the feed roller and whose axis lies approximately in the same horizontal plane as the axis of said feed roller and around which cloth roller the said material may fold and pass between said rollers, a vertically reciprocating vertical needle whose path lies between said rollers, said feed roller having an annular portion cut away in the path of said needle, said feed roller having annular grooves therein, cloth-guiding fingers lying in said grooves and extending downwardly and outwardly, said fingers being carried by said slide, and a presser foot above said cloth roller and adapted to press said material down thereupon.

55. In a blind stitching sewing machine, the combination of a feed roller whose axis is horizontal and which is adapted to feed the material to be worked upon in a vertical direction, a cloth roller parallel to and contiguous to the feed roller and whose axis lies approximately in the same horizontal plane as the axis of said feed roller and around which the said material may fold and pass between said rollers, a vertically reciprocating vertical needle whose path lies between said rollers, said feed roller having an annular portion cut away in the path of said needle, a shaft upon which said feed roller is secured, a slide having bearings for and carrying said shaft, said feed roller and slide being yieldable in a horizontal direction away from said cloth roller, said slide having a check for limiting its movement in each direction, a spring pressing said slide and feed roller towards said cloth roller, means for adjusting the tension of said spring, said feed roller having annular grooves therein, cloth-guiding fingers lying in said grooves and extending downwardly and outwardly, said fingers being carried by said slide, and a presser foot above said cloth roller and adapted to press said material down thereupon.

56. In a blind stitching sewing machine, the combination of a feed roller whose axis is horizontal and which is adapted to feed the material to be worked upon in a vertical direction, a cloth roller parallel to and contiguous to the feed roller and whose axis lies approximately in the same horizontal plane as the axis of said feed roller and around which cloth roller the said material may fold and pass between said rollers, a vertically reciprocating vertical needle whose path lies between said rollers, said feed roller having an annular portion cut away in the path of said needle, a shaft upon which said feed roller is secured, a slide having bearings for and carrying said shaft, said feed roller and slide being yieldable in a horizontal direction away from said cloth roller, said slide having a check for limiting its movement in each direction, a spring pressing said slide and feed roller towards said cloth roller, means for adjusting the tension of said spring, a clutch on said shaft, a lever extending downward from said clutch, a driving mechanism, a substantially horizontal link connecting said lever with said mechanism, said feed roller having annular grooves therein, cloth-guiding fingers lying in said grooves and extending downwardly and outwardly, said fingers being carried by said slide, and a presser foot above said cloth roller and adapted to press said material down thereupon.

57. In a blind stitching sewing machine, the combination of a feed roller whose axis is horizontal and which is adapted to feed the material to be worked upon in a vertical direction, a cloth roller parallel to and contiguous to the feed roller and lying approximately in the same horizontal plane and around which the said material may fold and pass between said rollers, a vertically reciprocating vertical needle whose path lies between said rollers, said feed rollers having an annular portion cut away in the path of said needle, a bed plate for the machine, a cloth plate to one edge of which said cloth roller is attached, a horizontally swinging work carrier pivoted on said bed plate, said cloth plate being mounted on said work carrier and adjustable thereon to and from said needle, a vertical pivot for said work carrier, a stop for limiting the inward movement of said carrier, a latch for locking said carrier in operative position, said feed roller having annular grooves therein, cloth-guiding fingers lying in said grooves and extending downwardly and outwardly, said fingers being carried by said slide, and a presser foot above said cloth roller and adapted to press said material down thereupon.

58. In a blind stitching sewing machine, the combination of a feed roller whose axis is horizontal and which is adapted to feed the material to be worked upon in a vertical direction, a cloth roller parallel to and contiguous to the feed roller and whose axis lies approximately in the same horizontal plane as the axis of said feed roller and around which cloth roller the said material may fold and pass between said rollers, a vertically reciprocating vertical needle whose path lies between said rollers, said feed roller having an annular portion cut away in the path of said needle, a shaft upon which said feed roller is secured, a slide having bearings for and carrying said shaft, said feed roller and slide being yieldable in a horizontal direction away from said cloth roller, said slide having a check for limiting its movement in each direction, a spring pressing said slide and feed roller towards said cloth roller, means for adjusting the tension of said spring, a clutch on said shaft, a lever extending downward from said clutch, a driving mechanism, a substantially horizontal link connecting said lever with said mechanism, a bed plate for the machine, a cloth plate to one edge of which said cloth roller is attached, a horizontally swinging work carrier pivoted on said bed plate, said cloth plate being mounted on said work carrier and adjustable thereon to and from said needle, a vertical pivot for said work carrier, a stop for limiting the inward movement of said carrier, a latch for locking said carrier in operative position, said feed roller having annular grooves therein, cloth-guiding fingers lying in said grooves and extending downwardly and outwardly, said fingers being carried by said slide, and a presser foot above said cloth roller and adapted to press said material down thereupon.

59. In a blind stitching sewing machine, the combination of a feed roller whose axis is horizontal and which is adapted to feed the material to be worked upon in a vertical direction, a cloth roller parallel to and contiguous to the feed roller and whose axis lies approximately in the same horizontal plane as the axis of said feed roller and around which cloth roller the said material may fold and pass between said rollers, a vertically reciprocating vertical needle whose path lies between said rollers, said feed roller having an annular portion cut away in the path of said needle, a bed plate for the machine, a cloth plate to one edge of which said cloth roller is attached, a horizontally swinging work carrier pivoted on said bed plate, said cloth plate being mounted on said work carrier and adjustable thereon to and from said needle, a vertical pivot for said work carrier, a stop for limiting the inward movement of said carrier, a latch for locking said carrier in operative position, said work carrier having a transverse undercut depression on its upper surface, said cloth plate being seated and guided in said depression and the upper surface of said cloth plate being flush with the upper surface of said work carrier, said carrier having a transverse slot therethrough and said cloth plate having an opening therethrough registering with said slot, a screw fixed transversely in said carrier and traversing said slot, a thumb nut movable on said screw in said slot and engaging said cloth plate at said opening, said feed roller having annular grooves therein, cloth-guiding fingers lying in said grooves and extending downwardly and outwardly, said fingers being carried by said slide, said slide having a depressed seat in its upper surface and adjoining said feed roller, a plate secured in said seat, the upper ends of said fingers being attached to said plate, and a presser foot above said cloth roller and adapted to press said material down thereupon.

60. In a blind stitching sewing machine, the combination of a feed roller whose axis is horizontal and which is adapted to feed the material to be worked upon in a vertical direction, a cloth roller parallel to and contiguous to the feed roller and whose axis lies approximately in the same horizontal plane as the axis of said feed roller and around which cloth roller the said material may fold and pass between said rollers, a vertically reciprocating vertical needle whose path lies between said rollers, said feed roller having an annular portion cut away in the path of said needle, a shaft upon which said feed roller is secured, a slide having bearings for and carrying said shaft, said feed roller and slide being yieldable in a horizontal direction away from said cloth roller, said slide having a check for limiting its movement in each direction, a spring pressing said slide and feed roller towards said cloth roller, means for adjusting the tension of said spring, a clutch on said shaft, a lever extending downward from said clutch, a driving mechanism, a substantially horizontal link connecting said lever with said mechanism, a bed plate for the machine, a cloth plate to one edge of which said cloth roller is attached, a horizontally swinging work carrier pivoted on said bed plate, said cloth plate being mounted on said work carrier and adjustable thereon to and from said needle, a vertical pivot for said work carrier, a stop for limiting the inward movement of said carrier, a latch for locking said carrier in operative position, said work carrier having a transverse undercut depression on its upper surface, said cloth plate being seated and guided in said depression and the upper surface of said cloth plate being flush with the upper surface of said work carrier, said carrier having a transverse slot therethrough and said cloth plate having an opening therethrough registering with said slot, a screw fixed transversely in said carrier and traversing said slot, a thumb nut movable on said screw in said slot and engaging said cloth plate at said opening, said feed roller having annular grooves therein, cloth-guiding fingers lying in said grooves and extending downwardly and outwardly, said fingers being carried by said slide, said slide having a depressed seat in its upper surface and adjoining said feed roller, a plate secured in said seat, the upper ends of said fingers being attached to said plate, and a presser foot above said cloth roller and adapted to press said material down thereupon.

61. In a blind stitching sewing machine, the combination of a feed roller whose axis is horizontal and which is adapted to feed the material to be worked upon in a vertical direction, a cloth roller parallel to and contiguous to the feed roller and whose axis lies approximately in the same horizontal plane as the axis of said feed roller and around which cloth roller the said material may fold and pass between said rollers, a vertically reciprocating vertical needle whose path lies between said rollers, said feed roller having an annular portion cut away in the path of said needle, a shaft upon which said feed roller is secured, a slide having bearings for and carrying said shaft, said feed roller and slide being yieldable in a horizontal direction away from said cloth roller, said slide having a check for limiting its movement in each direction, a spring pressing said slide and feed roller towards said cloth roller, means for adjusting the tension of said spring, a clutch on said shaft, a lever extending downward from said clutch, a driving mechanism, a substantially horizontal link connecting said lever with said mechanism, said mechanism consisting of a compound lever, a bed plate for the machine, said bed plate having guiding surfaces for receiving and guiding said slide, a retaining clip for said slide attached to said bed plate, a thumb piece secured to the top of said slide, said means consisting of a thumb screw, a bearing for said thumb screw attached to said bed plate, and a traveling nut on said thumb screw and engaging said spring, a cloth plate to one edge of which said cloth roller is attached, a horizontally swinging work carrier pivoted on said bed plate, said cloth plate being mounted on said work carrier and adjustable thereon to and from said needle, a vertical pivot for said work carrier, a stop for limiting the inward movement of said carrier, a latch for locking said carrier in operative position, said work carrier having a transverse undercut depression on its upper surface, said cloth plate being seated and guided in said depression and the upper surface of said cloth plate being flush with the upper surface of said work carrier, said carrier having a transverse slot therethrough and said cloth plate having an opening therethrough registering with said slot, a screw fixed transversely in said carrier and traversing said slot, a thumb nut movable on said screw in said slot and engaging said cloth plate at said opening, said feed roller having annular grooves therein, cloth-guiding fingers lying in said grooves and extending downwardly and outwardly, said fingers being carried by said slide, said slide having a depressed seat in its upper surface and adjoining said feed roller, a plate secured in said seat, the upper ends of said fingers being attached to said plate, and a presser foot above said cloth roller and adapted to press said material down thereupon.

62. In a blind stitching sewing machine, the combination of a vertically reciprocating vertical needle, a feed roller whose axis is horizontal, a cloth roller parallel to the feed roller and contiguous to the feed roller and to the needle and around which the material to be worked upon may continuously fold and pass between said rollers, and a presser foot above said cloth roller and adapted to press said material continuously down thereupon.

63. In a blind stitching sewing machine, the combination of a vertically reciprocating vertical needle, a feed roller whose axis is horizontal, a cloth roller parallel to the feed roller and contiguous to the feed roller and to the needle and around which the material to be worked upon may fold and pass between said rollers, and a presser foot above said cloth roller and adapted to press said material down thereupon, the axes of said feed roller and of said cloth roller lying approximately in the same horizontal plane and the path of said needle lying between said axes.

64. In a blind stitching sewing machine, the combination of a work-carrier around which the cloth to be sewed is folded, a needle reciprocating transversely of and contiguous to said work-carrier, a feed mechanism for feeding the cloth in the direction of the path of said needle, the said mechanism engaging the cloth substantially in the same plane as the axis of said needle, means for guiding said cloth transversely to the axis of and towards said needle, and a device for directing said cloth again transversely to the axis of and away from said needle, in a reverse direction.

65. In a blind stitching sewing machine, the combination of a work carrier having a working surface for the cloth to be sewed, a feeding mechanism for said cloth consisting of relatively spring pressed elements, a reciprocating needle whose path lies between said elements and at right angles to said surface, the said mechanism being adapted to feed the cloth from its path on said surface to a position below said surface, a presser foot constantly pressing upon the cloth above said surface, and a guide for the cloth below said surface.

66. In a blind stitching sewing machine, the combination of a work carrier having a working surface for the cloth to be sewed, a feeding mechanism for said cloth consisting of two active elements, a reciprocating needle whose path lies between said elements and at right angles to said surface, the said mechanism being adapted to feed the cloth from its path on said surface to a position below said surface, means above said surface for constantly pressing upon and folding the cloth, and a device for guiding the cloth below said surface.

67. In a blind stitching sewing machine, the combination of a cloth roller, means for holding the cloth down upon the cloth roller on one side thereof, and guide fingers on the other side of the cloth roller for directing the cloth under the roller.

68. In a blind stitching sewing machine, the combination of a work carrier having a plane working surface and an edge over which the cloth is folded to be sewed, devices for guiding the cloth from its path on said surface to a position on the opposite side of said carrier, a needle reciprocating transversely to said surface and adjacent to said edge, and a single device both for gripping the cloth at the end for starting and continuing to grip it at the stitching point while sewing, said means also operating to feed the cloth longitudinally of said needle.

69. In a blind stitching sewing machine, the combination of a cloth roller, a presser foot pressing the cloth down upon said roller with a constant pressure, a feed roller pressing the cloth against the side of said roller with a constant pressure, and guides for guiding the cloth under said roller.

70. In a blind stitching sewing machine, the combination of two rollers between which the cloth passes to be sewed, and a needle reciprocating between said rollers, the two rollers being movable jointly away from each other for putting the cloth in, one being a spring pressed roller and the other a manually movable roller, the former being movable in a straight line and the latter in an arc and means whereby the said latter roller is movable in an arc.

71. In a blind stitching sewing machine, the combination of two rollers between which the cloth passes to be sewed, a needle reciprocating between said rollers, the two rollers being movable jointly away from each other for putting the cloth in, one being a spring pressed roller and the other a manually movable roller, the former being movable in a straight line and the lattter in an arc, and a lock for locking the last named roller in position for sewing and means whereby the said latter roller is movable in an arc.

72. In a blind stitching sewing machine, the combination of a sewing machine table, parallel guides thereon, a slide between the guides, a feed roller carried by the slide, a thumb screw for adjusting the slide, a reciprocating needle, and a spring pressing the slide toward the path of the needle.

73. In a blind stitching sewing machine, the combination of a milled feed roller having peripheral grooves, a cloth roller opposed to said feed roller, guide fingers located in said grooves and extending beyond the surface of said feed roller and beneath said cloth roller, said feed roller also having an additional peripheral groove, and a needle reciprocating between said rollers in said last named groove.

In testimony whereof we have hereunto subscribed our names and affixed our seals this second day of December 1903.

CHARLES SCUDDER. [L. S.]
FRANK CORYELL. [L. S.]

Witnesses:
Wm. W. Howell,
H. C. Scudder.